United States Patent
Miyada

(10) Patent No.: US 8,656,281 B2
(45) Date of Patent: Feb. 18, 2014

(54) INFORMATION PROCESSING APPARATUS, INFORMATION PROCESSING METHOD, INFORMATION PROCESSING SYSTEM, AND PROGRAM

(75) Inventor: Naoyuki Miyada, Tokyo (JP)

(73) Assignee: Sony Corporation, Tokyo (JP)

( * ) Notice: Subject to any disclaimer, the term of this patent is extended or adjusted under 35 U.S.C. 154(b) by 491 days.

(21) Appl. No.: 12/564,252

(22) Filed: Sep. 22, 2009

(65) Prior Publication Data

US 2010/0077309 A1 Mar. 25, 2010

(30) Foreign Application Priority Data

Sep. 25, 2008 (JP) ................. P2008-246791

(51) Int. Cl.
 *G06F 3/00* (2006.01)
 *G06F 17/00* (2006.01)
 *H04N 7/173* (2011.01)
 *G06F 15/16* (2006.01)

(52) U.S. Cl.
 USPC ........... 715/717; 715/716; 715/718; 715/733; 715/201; 725/37; 725/109; 709/201; 709/217

(58) Field of Classification Search
 USPC ................. 715/716, 717, 718, 719, 201, 733; 725/37, 109; 709/201, 217
 See application file for complete search history.

(56) References Cited

U.S. PATENT DOCUMENTS

| | | | |
|---|---|---|---|
| 6,349,410 B1 * | 2/2002 | Lortz | 725/110 |
| 6,921,336 B1 * | 7/2005 | Best | 463/32 |
| 7,519,685 B2 | 4/2009 | Nonaka et al. | |
| 7,712,125 B2 * | 5/2010 | Herigstad et al. | 725/141 |
| 2005/0005297 A1 * | 1/2005 | Lee | 725/81 |
| 2006/0241798 A1 | 10/2006 | Watanabe et al. | |
| 2007/0157234 A1 * | 7/2007 | Walker | 725/38 |
| 2008/0235586 A1 * | 9/2008 | Chou et al. | 715/717 |
| 2009/0327894 A1 * | 12/2009 | Rakib et al. | 715/719 |
| 2010/0218211 A1 * | 8/2010 | Herigstad et al. | 725/34 |

FOREIGN PATENT DOCUMENTS

| | | |
|---|---|---|
| JP | 2003-506784 | 2/2003 |
| JP | 2004-091216 | 10/2004 |
| JP | 2004-328109 | 11/2004 |
| JP | 2006-301448 | 11/2006 |

* cited by examiner

*Primary Examiner* — Ting Lee
(74) *Attorney, Agent, or Firm* — Sherr & Jiang, PLLC

(57) ABSTRACT

An information processing apparatus including a meta information acquisition section for acquiring meta information of content displayed on a first display device, a specifying section for specifying network location information of information relating to the meta information, a generation section for generating display information of a screen to be displayed on a second display device, based on the network location information, and a communication section for transmitting the display information to the second display device.

10 Claims, 16 Drawing Sheets

FIG. 6

| DISK IDENTIFICATION INFORMATION | TITLE | DIRECTOR | CAST | PRODUCTION DATE |
|---|---|---|---|---|
| ... | ... | ... | ... | ... |
| xxxxxx | Spider-men9 | Sem Reimi | Tobay Meguira,Kirstan Dunst | yyyy/mm/dd |
| ... | ... | ... | ... | ... |

BD-ROM
Spidermen9

RECOMMENDED SCENE A (00:05:32) — 74
RECOMMENDED SCENE B (00:39:12) — 76
RECOMMENDED SCENE C (01:10:53) — 78

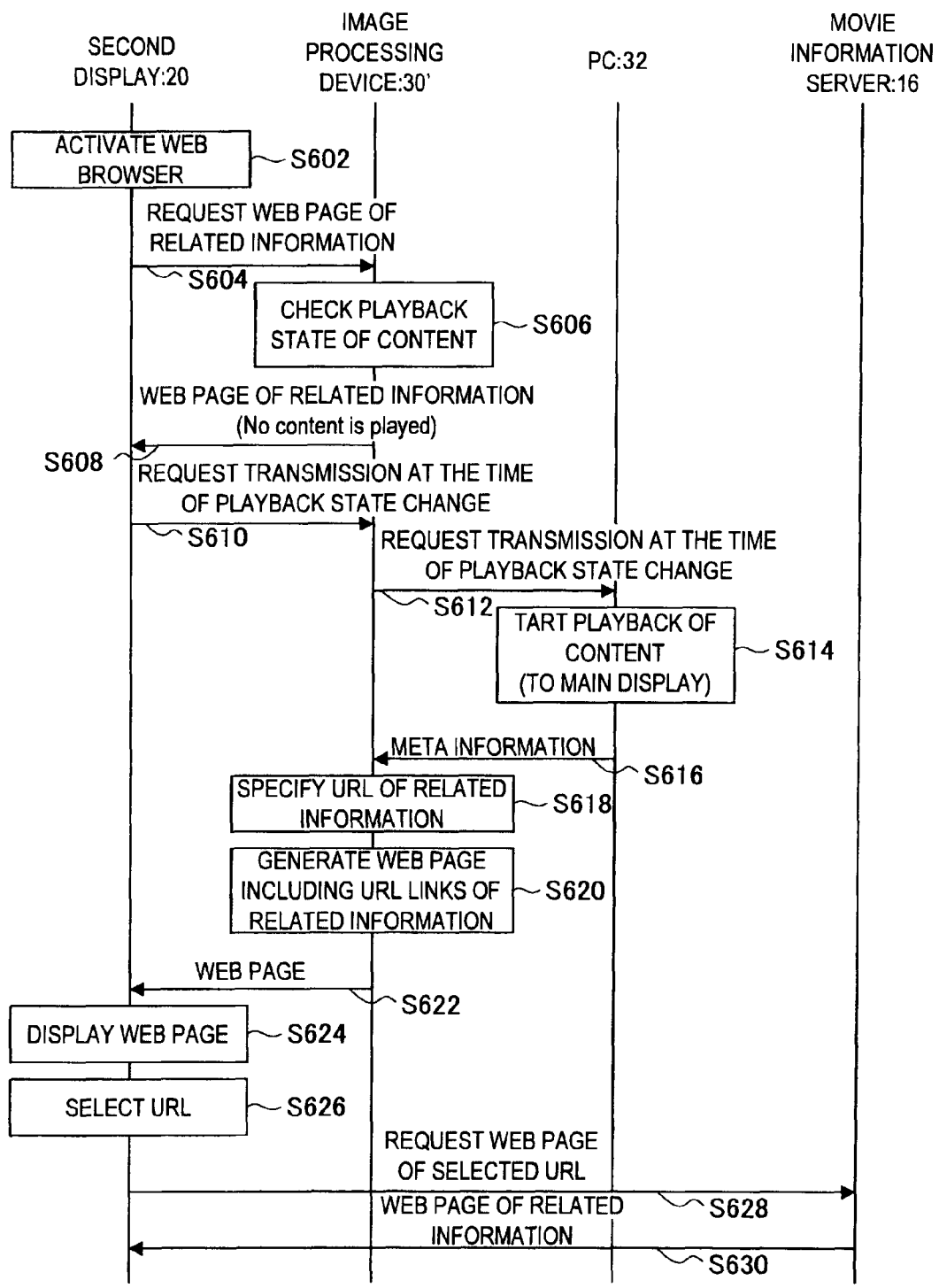

INFORMATION PROCESSING APPARATUS, INFORMATION PROCESSING METHOD, INFORMATION PROCESSING SYSTEM, AND PROGRAM

BACKGROUND OF THE INVENTION

1. Field of the Invention

The present invention relates to an information processing apparatus, an information processing method, an information processing system, and a program.

2. Description of the Related Art

In recent years, an image processing device having a Web (World Wide Web) browser function, premised on the output of a Web page to a television device, has been proposed. The television device is enabled by the image processing device to display information acquired from the Internet as well as general television broadcasting.

Furthermore, JP-A-2006-301448 discloses a recording/reproducing apparatus for acquiring information such as the title of a BGM of a television program, an artist name, or the like, and displaying the acquired information on the same screen along with the image of the television program.

SUMMARY OF THE INVENTION

However, in a living room or the like, a television device is located a few metres away from the viewing position of a user. Accordingly, even if, along with content such as a television program, information relating to the content acquired from the Internet is displayed on the television device, it is assumed that readability and legibility may be reduced.

In light of the above problem, it is desirable to provide an information processing apparatus, an information processing method, an information processing system, and a program that are new and improved, and that are capable of displaying content and related information of the content on separate display devices.

According to an embodiment of the present invention, there is provided an information processing apparatus including a meta information acquisition section for acquiring meta information of content displayed on a first display device; a specifying section for specifying network location information of information relating to the meta information; a generation section for generating display information of a screen to be displayed on a second display device, based on the network location information; and a communication section for transmitting the display information to the second display device.

The generation section may generate the display information of a screen including a first selection item associated with the network location information, and when the first selection item is selected on the second display device, information relating to the meta information may be acquired by the second display device from a location indicated by the network location information.

The generation section may further generate the display information of a screen including a second selection item associated with the network location information; and the information processing apparatus may include a related information acquisition section for acquiring information relating to the meta information from a location indicated by the network location information, when the second selection item is selected on the second display device, and a display control section for making the first display device display the information relating to the meta information.

The information processing apparatus may further include a related information acquisition section for acquiring information relating to the meta information from a location indicated by the network location information, and a playback control section for controlling playback of the content; and the information relating to the meta information may include information indicating any playback point in the content, the generation section may generate the display information of a screen including a third selection item associated with the playback point, and the playback control section may perform control so that, when the third selection item is selected on the second display device, the content is played back from the playback point.

The information processing apparatus may further include a related information acquisition section for acquiring information relating to the meta information from a location indicated by the network location information, and the generation section may generate the display information of a screen indicating the information relating to the meta information.

The acquisition section may acquire, from a playback device playing back content displayed on the first display device, the meta information of the content.

The information processing apparatus may further include a playback section for playing back the content.

According to another embodiment of the present invention, there is provided an information processing method including the steps of acquiring meta information of content displayed on a first display device; specifying network location information of information relating to the meta information; generating display information of a screen to be displayed on a second display device, based on the network location information; and transmitting the display information to the second display device.

The display information of a screen including a first selection item associated with the network location information may be generated in the step of generating, and when the first selection item is selected on the second display device, information relating to the meta information may be acquired by the second display device from a location indicated by the network location information.

The display information of a screen including a second selection item associated with the network location information may be further generated in the step of generating; and the information processing method may further include the steps of acquiring information relating to the meta information from a location indicated by the network location information, when the second selection item is selected on the second display device, and making the first display device display the information relating to the meta information.

According to another embodiment of the present invention, there is provided an information processing system including a first display device for displaying content; an information processing apparatus having a meta information acquisition section for acquiring meta information of the content displayed on the first display device, a specifying section for specifying network location information of information relating to the meta information, a generation section for generating display information of a screen based on the network location information, and a communication section for transmitting the display information; and a second display device for displaying a screen based on the display information transmitted from the communication section of the information processing apparatus.

According to another embodiment of the present invention, there is provided a program for causing a computer to function as a meta information acquisition section for acquiring meta information of content displayed on a first display device; a specifying section for specifying network location information of information relating to the meta information; a generation section for generating display information of a screen to be displayed on a second display device, based on the network location information; and a communication section for transmitting the display information to the second display device.

According to the embodiments of the present invention described above, content and related information of the content can be displayed on separate display devices.

BRIEF DESCRIPTION OF THE DRAWINGS

FIG. 6 is an explanatory diagram showing a concrete example of meta information of content stored in a disk identification server;

FIG. 16 is a sequence diagram showing a flow of an operation of the image display system according to the third embodiment.

DETAILED DESCRIPTION OF THE PREFERRED EMBODIMENTS

Figure 1:
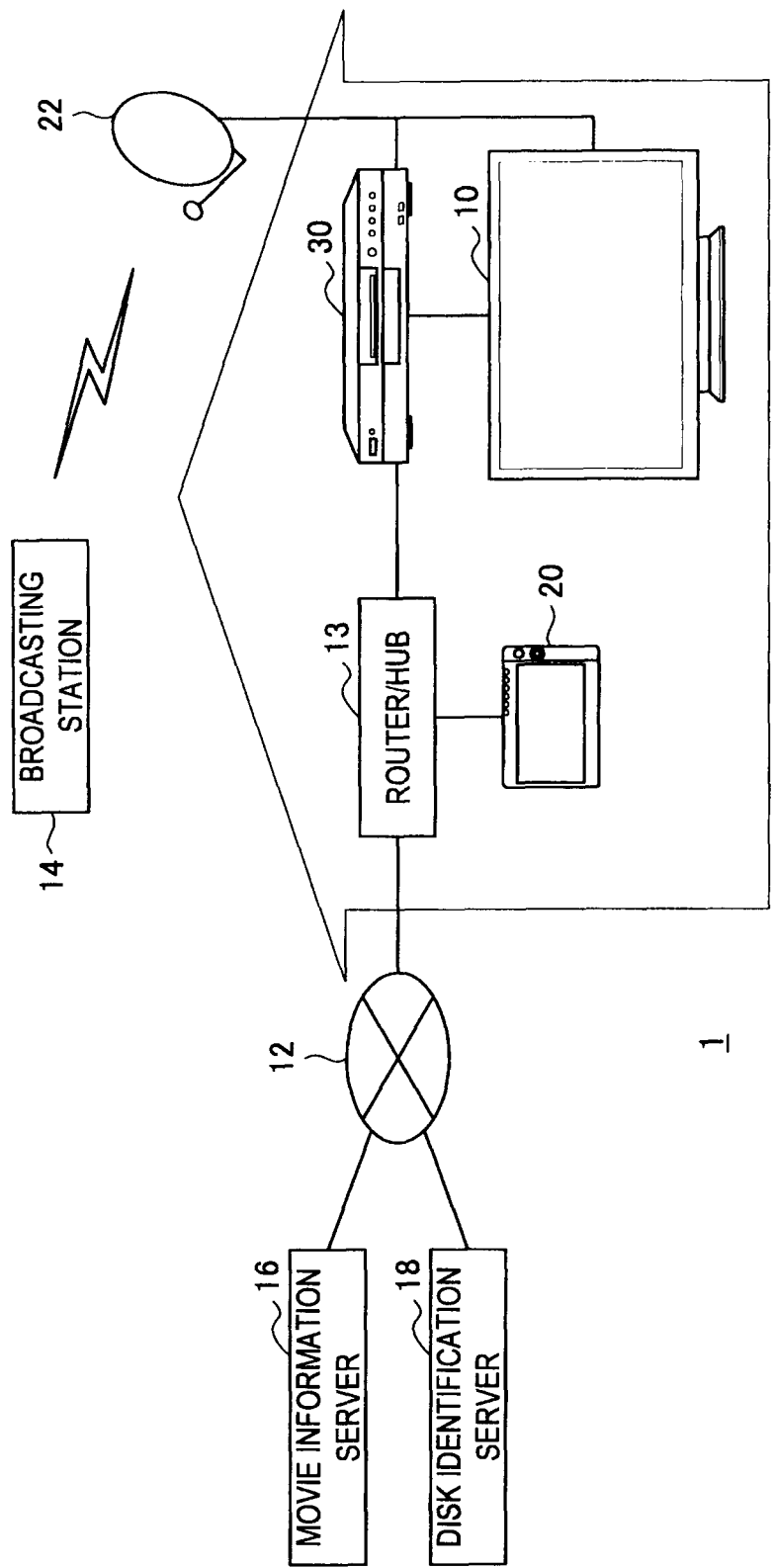
FIG. 1 is an explanatory diagram showing an overall configuration of an image display system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "DETAILED DESCRIPTION OF THE PREFERRED EMBODIMENTS" will be described in the order shown below.

1. First Embodiment
1.1 Overall Configuration of Image Display System according to First Embodiment
1.2 Hardware Configuration of Each Device
1.3 Configuration of Second Display
1.4 Function of Image Processing Device
(First Example)
(Second Example)
(Third Example)
(Fourth Example)
2. Second Embodiment
3. Third Embodiment
4. Supplementary
<1. First Embodiment>
(1.1 Overall Configuration of Image Display System According to First Embodiment)

First, with reference to FIG. 1, an overall configuration of an image display system 1 according to a first embodiment of the present invention will be described.

FIG. 1 is an explanatory diagram showing the overall configuration of the image display system 1 according to the first embodiment. As shown in FIG. 1, the image display system 1 according to the first embodiment includes a main display 10, a router/hub 13, a second display 20, an antenna 22, and an image processing device 30. Furthermore, the image display system 1 includes a network 12, a broadcasting station 14, a movie information server 16, and a disk identification server 18.

The movie information server 16 and the disk identification server 18 are connected to the second display 20 and the image processing device 30 located at home via the network 12 and the router/hub 13. The network 12 is a wired or wireless transmission line for information to be transmitted from a device connected to the network 12. In the present embodiment, communication is established, for example, between the image processing device 30 and the disk identification server 18 via the network 12 or between the image processing device 30 and the movie information server 16.

For example, the network 12 may include public network such as the Internet, telephone network or satellite network, or various local area networks (LANs) including the Ethernet (registered trademark), a wide area network (WAN) or the like. Furthermore, the network 12 may include a leased line network such as Internet Protocol-Virtual Private Network (IP-VPN).

The movie information server 16 stores display information of a Web page relating to a movie, an actor and an actress (meta information of content), and transmits the stored display information of the Web page in response to a request from the image processing device 30, for example.

For example, a Web page relating to a movie may include, with regard to a movie, information such as the storyline, a thumbnail, or a recommended scene of the movie. Furthermore, a Web page relating to an actor or actress may include information such as a photograph, career, and date of birth of an actor or actress. Furthermore, the display information of a Web page may be in any format, such as HyperText Markup Language (HTML) format or an eXtensible Markup Language (XML) format.

Furthermore, the movie information server 16 is only shown, in FIG. 1, as an example of a content information server storing information relating to content, and the image display system 1 may include any content information server.

Here, the content may be audio such as music, a lecture or a radio program, an image such as a movie, a television program, a video program, a photograph, a document, a painting or a chart, and any data such as a game or software. Accordingly, the content information server may be exemplified by a music information server storing lyrics, a score or the like of music, a photograph information server storing description, a photographing location or the like of a photograph, or the like, for example.

The disk identification server 18 stores meta information of content stored on an optical disk distributed in the market, and transmits the stored meta information of content in response to a request from the image processing device 30, for example. More particularly, the disk identification server 18 stores the meta information of content in association with disk identification information assigned to the optical disk, and transmits, to a request source, the meta information associated with the disk identification information transmitted from the request source.

Here, the meta information of content may be, for example, the title, the director, the cast, the information amount, the playing time, the genre, and the production date, respectively of content. Furthermore, the optical disk may be a Compact Disc (CD), a Digital Versatile Disc Recordable (DVD-R), a Blu-Ray Disc (BD; registered trademark), or the like.

Furthermore, in FIG. 1, the optical disk is shown as an example of a storage medium storing content and the image display system 1 is shown to include the disk identification server 18 only as an example, and the image display system 1 may include any identification server. For example, the storage medium may be, in addition to the optical disk, a non-volatile memory, a magnetic disk, a magneto optical (MO) disk, or the like. Accordingly, the identification server may be exemplified by a non-volatile memory identification server storing the meta information of content stored on the non-volatile memory, a magnetic disk identification server storing the meta information of content stored on the magnetic disk, or the like.

Moreover, the non-volatile memory may be, for example, an electrically erasable programmable read-only memory (EEPROM) or an erasable programmable ROM (EPROM). Furthermore, the magnetic disk may be a hard disk, a discoid magnetic disk, or the like.

The broadcasting station 14 transmits program content of television broadcasting via airwaves, the leased line network, or the like. The television broadcasting may be television broadcasting in any format, such as a Broadcast Satellite (BS) broadcasting, a communications satellite (CS) broadcasting, a digital terrestrial broadcasting, an analog terrestrial broadcasting, a cable broadcasting, or the like. Furthermore, the broadcasting station 14 may transmit, in addition to the program content, information relating to the program content (for example, an Electronic Program Guide: EPG). The program content transmitted from the broadcasting station 14 is received by the antenna 22, and is supplied to the image processing device 30 or the main display 10.

The image processing device 30 is an information processing apparatus for generating a display screen for content, and transmitting the generated display screen to the main display 10. For example, the image processing device 30 may acquire content data via the network 12 or from the broadcasting station 14 via the antenna 22. Furthermore, the image processing device 30 may acquire content from the storage medium such as the non-volatile memory, the magnetic disk, the optical disk, the MO disk, or the like.

As described above, the image processing device 30 according to the present embodiment may acquire content by any method. However, in the following, explanation will be made with emphasis on an example where the image processing device 30 acquires the content from the optical disk and generates (reproduces) a display screen.

Moreover, the image processing device 30 may be an information processing apparatus such as a personal computer (PC), a household image processing device (a DVD recorder, a video recorder or the like), a Personal Digital Assistant (PDA), a home game machine, or an electrical household appliance. Furthermore, the image processing device 30 may be an information processing apparatus such as a portable image processing device or a portable game machine.

The main display 10 (first display device) displays a display screen inputted from the image processing device 30. The main display 10 may be a cathode ray tube (CRT) display device, a liquid crystal display (LCD) device, or an organic light emitting diode (OLED) device. Furthermore, the main display 10 and the image processing device 30 may be connected with each other by a high-definition multimedia interface (HDMI) or by a component.

The second display 20 (second display device) is LAN (Local Area Network) connected to the image processing device 30 via the router/hub 13. Moreover, the second display 20 and the image processing device 30 may communicate with each other by a wireless communication system defined by Institute of Electrical and Electronic Engineers (IEEE) 802.11a, b, g, or the like. Furthermore, the communication system may be Multiple Input Multiple Output (MIMO) communication system defined by IEEE 802.11n, or a communication system compatible with a wired LAN defined by IEEE 802.3.

Furthermore, the second display 20 may be, as an example, smaller in display area, lighter in weight and superior in portability than the main display 10. Furthermore, the second display 20 may operate on electric power supplied from a battery, and the main display 10 may operate on electric power from an outlet.

(Circumstances Leading to Present Embodiment)

Currently, most of the services provided on the Internet are optimized for Web browser of a PC, and a client making access is assumed to be a PC. On the other hand, Web browser is increasingly being installed on a video device such as a player, a recorder, a game machine, or the like, premised on an output to a television. However, it will take a large amount of memory for the video device to display an HTML page generated for Web browser operating on a PC. Accordingly, with the video device described above, timing at which the Web browser can be operated may be limited due to the limitation on memory resources. Particularly, when playing back a high-definition (HD) moving image content, since a large amount of memory resources is used, it is difficult for the video device to activate the Web browser at the same time as playing back the HD moving image content.

As a result, an inconvenience may occur that the timing at which related information of content on the Internet can be browsed is limited, and that it is difficult for a user to access the related information while viewing the content. Although the problem can be solved if an ample amount of memory is installed, it is not realistic in consideration of the current situation where there is a fierce cost competition.

Furthermore, from the viewpoint of license, it may not be permitted to display content acquired from the Internet overlappingly on commercial content protected by copyright. Furthermore, there is a concern that dividing a display screen into a display area of content and a display area of related information of the content may result in a loss of impact of the original content.

Furthermore, in a living room or the like, the television device is located a few metres away from the viewing position of a user. Thus, even if, along with content such as a television program, information relating to the content acquired from the Internet is displayed on the television device, it is assumed that readability and legibility may be reduced.

Because of the reasons described above, in a case a user desired to acquire the related information of content currently being viewed on the television, the user often manually inputted a keyword relating to the content to another device and conducted a search. However, there is a problem that reading a keyword for search from a package or from detailed information on the television and inputting the same to another device, such as a PC or a mobile phone, may be bothersome to the user.

Accordingly, the image display system 1 of the present embodiment has been attained in view of the above circumstances. According to the image display system 1 according to the present embodiment, content can be displayed on the main display 10, and at the same time, related information of the content can be displayed on the second display 20 while simplifying or removing a user operation. With this configuration, the user can view the content on the main display 10 while easily perceiving, on the second display 20, related information of the content being viewed. In the following, the image display system 1 according to the present embodiment will be described in detail with reference to FIGS. 2 to 12.

(1.2 Hardware Configuration of Each Device)

Figure 2:
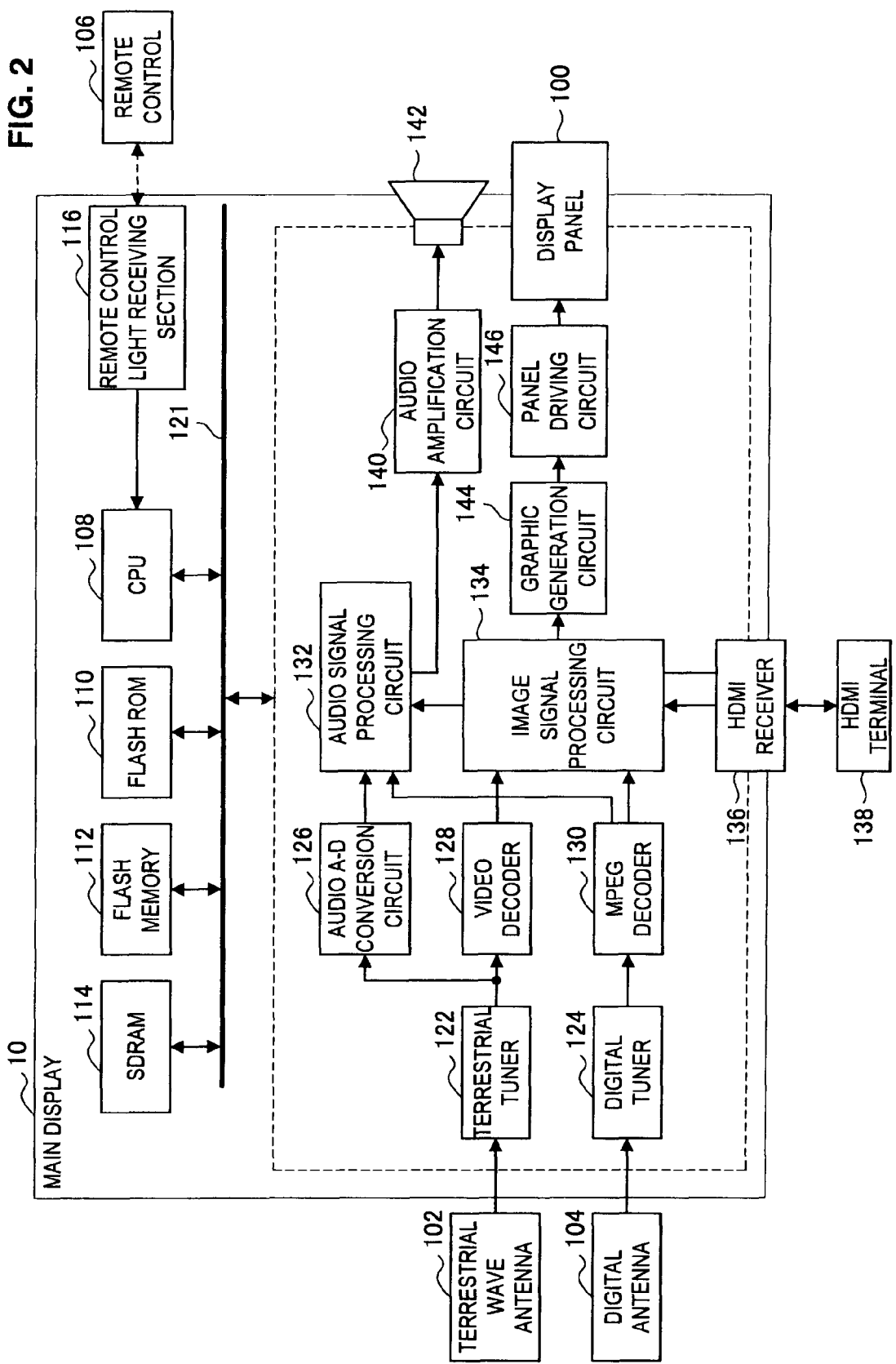
FIG. 2 is a block diagram showing a hardware configuration of a main display according to the present embodiment.

FIG. 2 is a block diagram showing a hardware configuration of the main display 10 according to the present embodiment.

As shown in FIG. 2, the main display 10 includes a display panel 100, a CPU 108, a flash ROM 110, a flash memory 112, and a synchronous dynamic random access memory (SDRAM) 114. Furthermore, the main display 10 includes a remote control light receiving section 116, a terrestrial tuner 122, and a digital tuner 124. Furthermore, the main display 10 includes an audio A-D conversion circuit 126, a video decoder 128, a MPEG decoder 130, an audio signal processing circuit 132, and an image signal processing circuit 134. Furthermore, the main display 10 includes an HDMI receiver 136, an HDMI terminal 138, an audio amplification circuit 140, a speaker 142, a graphic generation circuit 144, and a panel driving circuit 146.

The terrestrial tuner 122 receives a broadcast signal sent from a terrestrial wave antenna 102 for receiving an analog terrestrial wave, and demodulates an image signal and an audio signal included in the broadcast signal to baseband signals. Among the baseband signals obtained by the demodulation at the terrestrial tuner 122, the audio signal is sent to the audio A-D conversion circuit 126 and the image signal is sent to the video decoder 128.

The digital tuner 124 receives a broadcast signal sent from a digital antenna 104 for receiving digital broadcasting, and converts the received broadcast signal to a MPEG2 Transport Stream (MPEG2-TS). The MPEG2-TS obtained is sent to the MPEG decoder 130. Moreover, the digital antenna 104 and the terrestrial wave antenna 102 correspond to the antenna 22 shown in FIG. 1.

The audio A-D conversion circuit 126 receives an analog audio signal demodulated by the terrestrial tuner 122, and converts the analog audio signal to a digital audio signal. The digital audio signal obtained is sent to the audio signal processing circuit 132.

The video decoder 128 receives the image signal demodulated by the terrestrial tuner 122, and converts the analog image signal to a digital component signal. The digital component signal obtained by the conversion is sent to the image signal processing circuit 134.

The MPEG decoder 130 receives the MPEG2-TS sent from the digital tuner 124; and as for the audio, converts the MPEG2-TS to a digital audio signal, and as for the image, converts the MPEG2-TS to a digital component signal. The digital audio signal obtained by the conversion is sent to the audio signal processing circuit 132, and the digital component signal obtained by the conversion is sent to the image signal processing circuit 134.

The audio signal processing circuit 132 receives the digital audio signals sent from the audio A-D conversion circuit 126 and the MPEG decoder 130, and performs signal processing on the digital audio signals. The audio signals that are signal-processed are sent to the audio amplification circuit 140.

The audio amplification circuit 140 receives the audio signal outputted from the audio signal processing circuit 132, and outputs the audio signal after amplifying the same by a predetermined amount. The amplification amount at the audio amplification circuit 140 depends on the audio volume specified by the user of the main display 10. The audio signal amplified by the audio amplification circuit 140 is sent to the speaker 142. The speaker 142 outputs audio based on the audio signal sent from the audio amplification circuit 140.

The image signal processing circuit 134 receives digital component signals sent from the video decoder 128 and the MPEG decoder 130, and performs signal processing on the digital component signals. The digital component signals after the signal processing are sent to the graphic Generation circuit 144.

The HDMI receiver 136 receives a digital baseband signal inputted from the HDMI terminal 138, which is one of external input terminals. The digital baseband signal received at the HDMI receiver 136 is sent to the audio signal processing circuit 132 and the image signal processing circuit 134, and signal processing is performed on respective audio signal and digital component signal.

The graphic generation circuit 144 generates a graphic screen (for example, an operation menu screen for an extension function) which will be necessary for the operation of the main display 10. A different graphic screen will be generated as the graphic screen which will be necessary for the operation of the main display 10, depending on an operation of the user. The graphic screen generated by the graphic generation circuit 144 is sent to the panel driving circuit 146, being superimposed on or replaced from the image signal (i.e. the digital component signal after signal processing) sent from the image signal processing circuit 134. Moreover, in a case the graphic screen is not to be generated, the image signal sent from the image signal processing circuit 134 may be passed on to the panel driving circuit 146 as it is.

The panel driving circuit 146 generates a panel drive signal which will be necessary for displaying an image on the display panel 100, from the image signal sent from the graphic generation circuit 144. The panel drive signal 146 generated by the panel driving circuit 146 is sent to the display panel 100, and an image is displayed on the display panel 100 by the display panel 100 operating according to the panel drive signal.

The display panel 100 displays an image (a moving image or a still image) based on the panel drive signal sent from the panel driving circuit 146. The display panel 100 is configured from, for example, a liquid crystal display (LCD). However, it may also be a plasma display panel (PDP), an organic electro-luminescence (EL) panel, or the like.

The CPU 108, the flash ROM 110, the flash memory 112 and the SDRAM 114 configure the above-described embedded system. The embedded system controls each section of the above-described main display 10, and also executes various extension functions by operating using downloaded software.

The CPU 108 functions as a control section for controlling each section of the main display 10. The CPU 108 controls each section of the main display 10 by reading out and sequentially executing computer programs stored in the flash ROM 110.

The flash ROM 110 stores computer programs for the CPU 108 to control each section of the main display 10. The flash memory 112 is a readable/writable memory. The SDRAM 114 is a temporary operation area for the CPU 108 to execute each of the above-described computer programs.

The remote control light receiving section 116 receives a signal transmitted from a remote control 106. The signal received at the remote control light receiving section 116 is inputted to the CPU 108. The CPU 108 deciphers a control code included in the signal, and controls each section of the main display 10 to operate in accordance with the control code (volume adjustment, channel setting, display of operation menu, or the like).

Moreover, each section of the main display 10 is connected with each other by an internal bus 121, and is configured to be able to be controlled by the CPU 108. Furthermore, the main display 10 and the remote control 106 may communicate with each other in a wireless manner. Furthermore, the main body of the main display 10 may be provided with an input section formed from a button, a dial, or the like for the user operation. Furthermore, although an example is shown in FIG. 2 where the main display 10 includes a tuner and a decoder, the main display 100 does not have to include the tuner and the decoder. Furthermore, although an example is shown in FIG. 2 where the main display 10 is connected to an external device such as the image processing device 30 via the HDMI terminal 138, the main display 10 may be connected to the external device by a component.

Next, a hardware configuration of the second display according to the present embodiment will be described with reference to FIG. 3.

Figure 3:
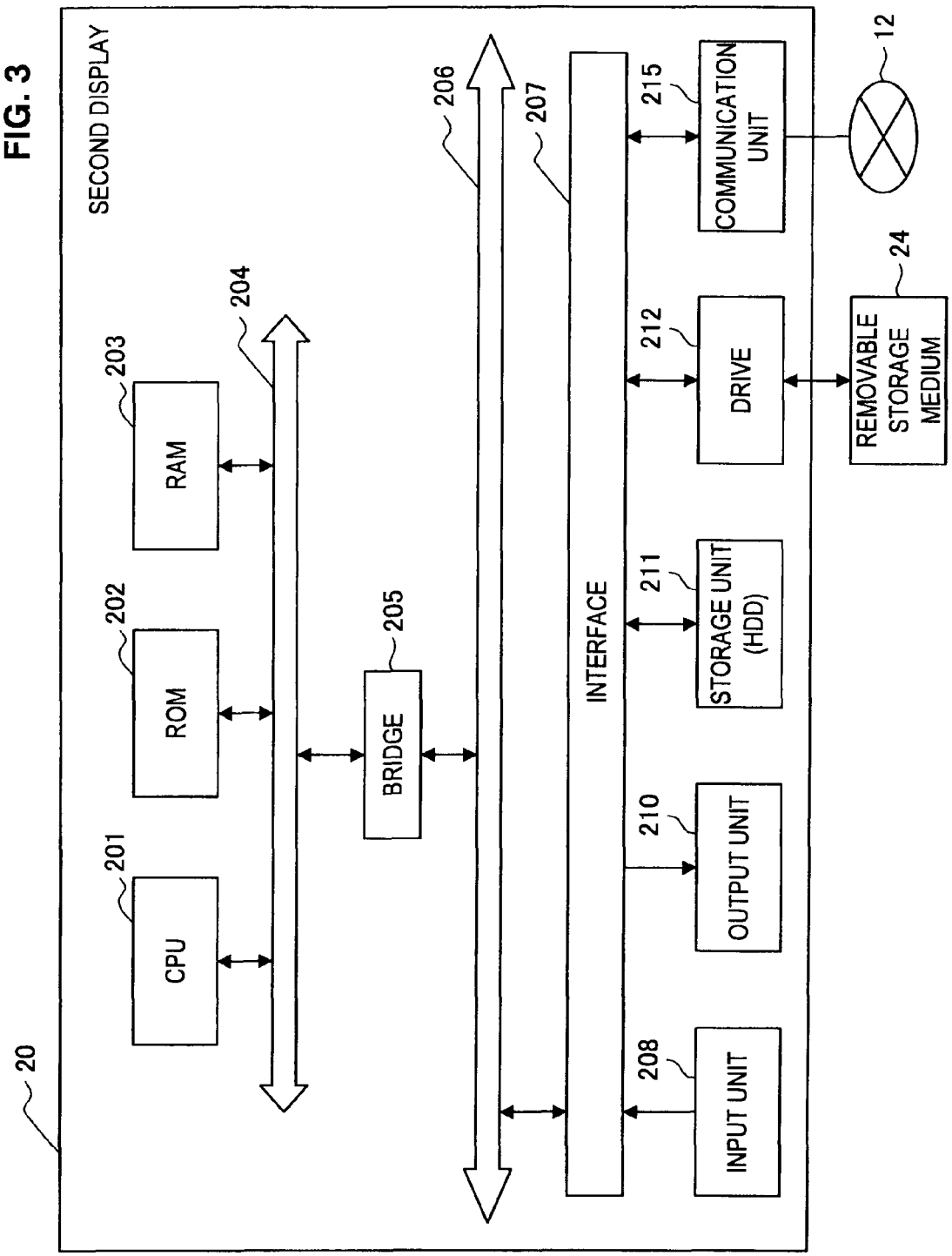
FIG. 3 is a block diagram showing a hardware configuration of a second display.

FIG. 3 is a block diagram showing the hardware configuration of the second display 20. The second display 20 includes a central processing unit (CPU) 201, a read only memory (ROM) 202, a random access memory (RAM) 203, and a host bus 204. Furthermore, the second display 20 includes a bridge 205, an external bus 206, an interface 207, an input unit 208, an output unit 210, a storage unit (HDD) 211, a drive 212, and a communication unit 215.

The CPU 201 functions as an arithmetic processing device and a control device, and controls the overall operation of the second display 20 according to various programs. Furthermore, the CPU 201 may be a microprocessor. The ROM 202 stores a program, arithmetic parameters or the like to be used by the CPU 201. The RAM 203 temporarily stores a program to be used by the CPU 201 in its execution, parameters that change appropriately in the execution of the program, or the like. These are interconnected through the host bus 204 configured from a CPU bus or the like.

The host bus 204 is connected to the external bus 206 such as a peripheral component interconnect/interface (PCI) bus via the bridge 205. The host bus 204, the bridge 205 and the external bus 206 do not necessarily have to be configured separately from each other, and functions thereof may be implemented in a single bus.

The input unit 208 is configured from input means for the user to input information, such as a mouse, a keyboard, a touch panel, a button, a microphone, a switch, a lever or the like, and an input control circuit for generating an input signal based on an input by the user and outputting the input signal to the CPU 201. The user of the second display 20 can input various types of data to the second display 20 or issue an instruction for a processing operation by operating the input unit 208.

The output unit 210 includes, for example, a display device such as a cathode ray tube (CRT) display device, a liquid crystal display (LCD) device, an organic light emitting diode (OLED) device, a lamp or the like. Furthermore, the output unit 210 includes an audio output device such as speakers, a head phone or the like. Specifically, various types of information are displayed in the form of text or image based on the display information. On the other hand, the audio output device converts reproduced audio data or the like to sound and outputs the sound.

The storage unit 211 is a data storage device configured as an example of a storage section of the second display 20 according to the present embodiment. The storage unit 211 may include a storage medium, a recording unit for recording data on the storage medium, a reading unit for reading out data from the storage medium, a deleting unit for deleting data recorded on the storage medium, or the like. The storage unit 211 is configured from a hard disk drive (HDD), for example. The storage unit 211 drives the hard disk, and stores a program to be executed by the CPU 201 and various types of data.

The drive 212 is a reader/writer for the storage medium, and is built in or externally attached to the second display 20. The drive 212 reads out information stored in an attached removable recording medium 24 such as a magnetic disk, an optical disk, a magneto-optical disk, a semiconductor memory or the like, and outputs the information to the RAM 203.

The communication unit 215 is, for example, a communication interface configured from a communication device or the like for connecting to the network 12. The communication unit 215 may be, for example, a wireless local area network (LAN) compatible communication device, a wireless USB compatible communication device, or a wired communication device for performing communication by wire. The communication unit 215 may transmit/receive various types of information to/from the image processing device 30 and the network 12.

Moreover, the hardware configuration of the second display 20 has been described above with reference to FIG. 3. The hardware of the image processing device 30 can be configured to be substantially the same as that of the second display 20, and explanation thereof will be omitted.

(1.3 Configuration of Second Display)

Heretofore, the hardware configuration of each device has been described with reference to FIGS. 2 and 3. Subsequently, explanation will be made on the second display 20 with reference to FIG. 4.

Figure 4:
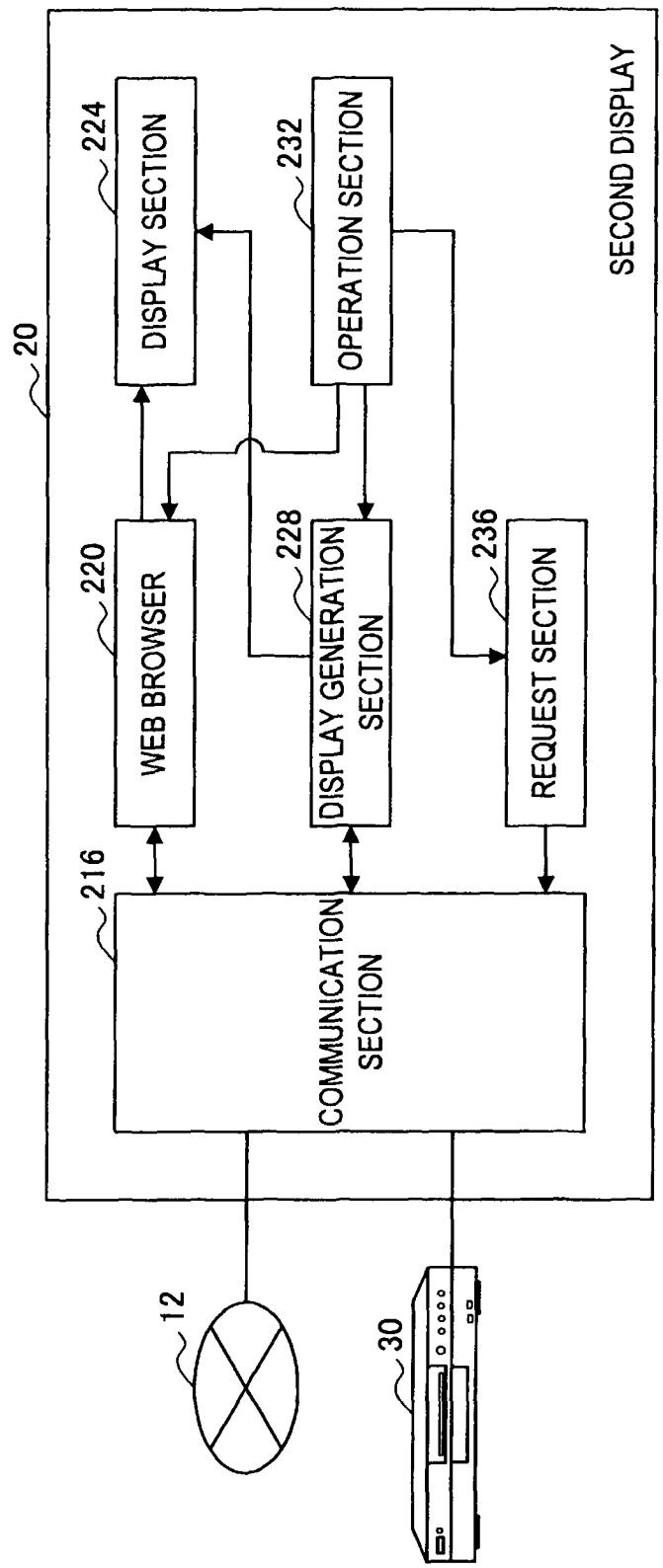
FIG. 4 is a functional block diagram showing a configuration of the second display according to the first embodiment of the present invention.

FIG. 4 is a functional block diagram showing a configuration of the second display 20 according to the first embodiment of the present invention. As shown in FIG. 4, the second display 20 includes a communication section 216, a Web browser 220, a display section 224, a display generation section 228, an operation section 232, and a request section 236.

Moreover, the Web browser 220, the display generation section 228, the request section 236, and the like, of the second display 20 are realized by the CPU 201, the RAM 203 and the like built in the second display 20 performing arithmetic and control in cooperation with each other.

The communication section 216 is an interface to the image processing device 30 and the movie information server 16, and functions as a transmission section and a reception section for transmitting/receiving various types of information to/from the image processing device 30 and the movie information server 16.

The Web browser 220 is a module for browsing a Web page. Specifically, the Web browser 220 acquires display information of a Web page expressed in HTML, XHTML or the like from the network 12, analyzes content of the HTML or the XHTML, and generates a Web page in a layout based on the analysis result. For example, the Web browser 220 can specify the URL of the movie information server 16, acquire the display information of a Web page stored in the movie information server 16, and generate a Web page relating to a movie or an actor based on the acquired display information.

The display section 224 displays a Web page generated by the Web browser 220 and a display screen generated by the display generation section 228. The display section 224 may be, for example, a LCD, a PDP, or an organic EL.

The display generation section 228 generates various display screens, and makes the display section 224 display the various display screens. For example, the display generation section 228 generates a user interface screen for the user to input various instructions to the second display 20.

The operation section 232 detects input of various instructions and various types of information by the user operation. The operation section 232 detects an operation by the user for selecting a selection item such as a link or a button included in the Web page.

The request section 236 makes various requests to the image processing device 30 based on the user operation to the operation section 232. The various requests include a playback request to the image processing device 30 to be described with reference to FIGS. 11 and 12.

(1.4 Function of Image Processing Device)

FIRST EXAMPLE

Figure 5:
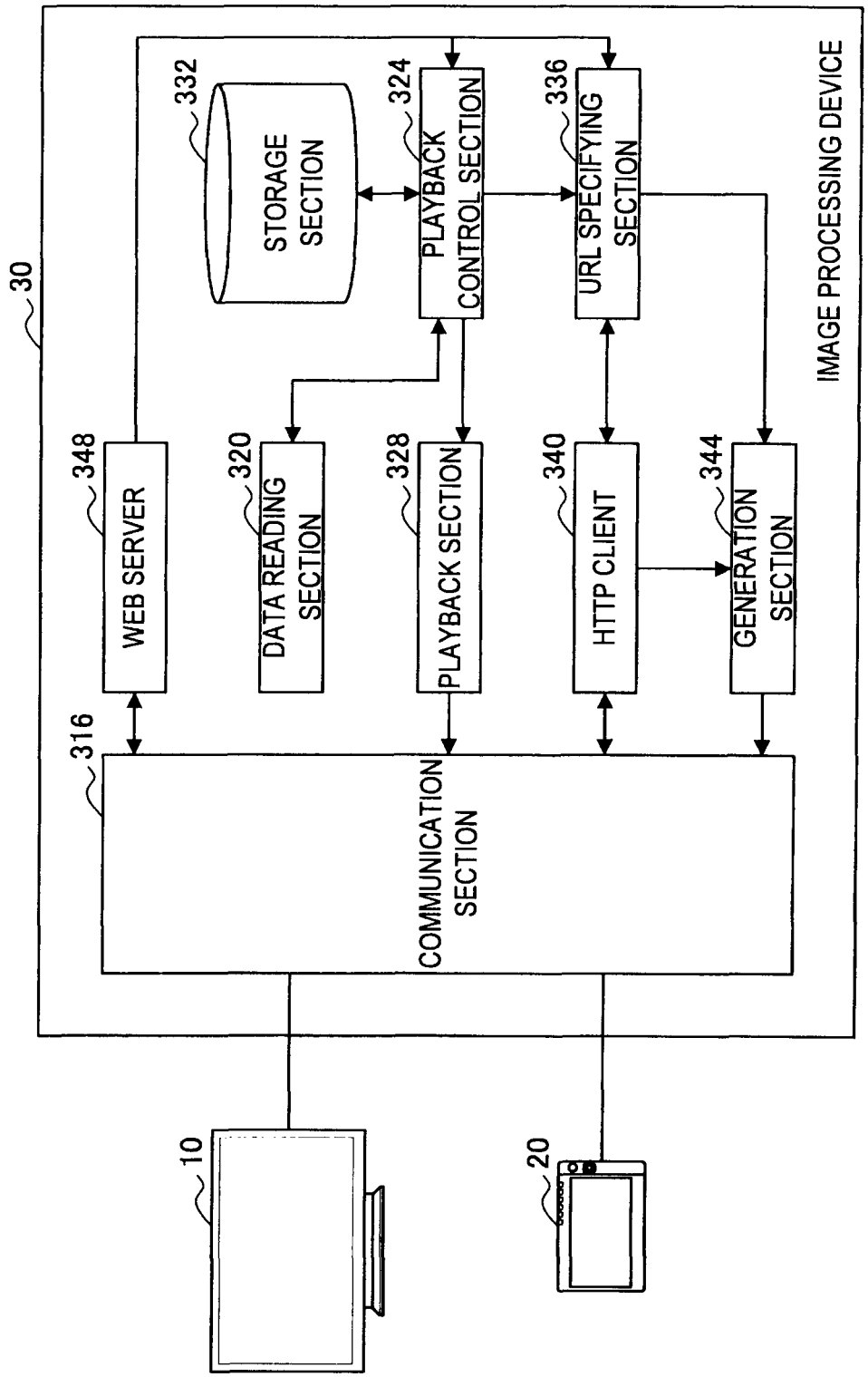
FIG. 5 is a functional block diagram showing a configuration of an image processing device.

FIG. 5 is a functional block diagram showing a configuration of the image processing device 30. As shown in FIG. 5, the image processing device 30 includes a communication section 316, a data reading section 320, a playback control section 324, a playback section 328, a storage section 332, a URL specifying section 336, an HTTP client 340, a generation section 344, and a Web server 348.

Moreover, the playback control section 324, the playback section 328, the URL specifying section 336, the HTTP client 340, the generation section 344, the Web server 348 and the like of the image processing device 30 are realized by installing a program for executing the function of each of the configuration elements on the image processing device 30. That is, each of the configuration elements described above can be realized by the CPU, the RAM and the like built in the image processing device 30 performing, in cooperation with each other, arithmetic and control in accordance with the program.

The communication section 316 is an interface to the second display 20, the movie information server 16, the main display 10, or the like. The communication section 316 functions as a transmission section and a reception section for transmitting/receiving various types of information to/from the second display 20, the movie information server 16, the main display 10 or the like.

The data reading section 320 reads content and disk identification information from a storage medium such as an optical disk, a non-volatile memory or the like. Furthermore, in a case meta information of content is also stored in the storage medium, the data reading section 320 reads the meta information as well. The data reading section 320 may be an optical disk drive, for example.

The playback control section 324 performs playback control of the content read by the data reading section 320. For example, the playback control section 324 performs the playback control based on a user operation to the image processing device 30, or a request received by the Web server 348 from the second display 20.

The playback section 328 plays back the content read by the data reading section 320 according to the control by the playback control section 324. The content played back by the playback section 328 is transmitted to the main display 10 via the communication section 316, and is displayed on the main display 10. Moreover, although an example has been described above where the playback section 328 plays back content read by the data reading section 320, the present embodiment is not limited to such an example. For example, the playback section 328 may playback content stored in the storage section 332 configured from a HDD.

The URL specifying section 336 specifies a URL (network location information) of related information of meta information of content to be played back by the playback section 328. For that purpose, first, the HTTP client 340 (meta information acquisition section) transmits disk identification information read by the data reading section 320 to the disk identification server 18, and acquires meta information of content from the disk identification server 18.

FIG. 6 is an explanatory diagram showing a concrete example of the meta information of content stored in the disk identification server 18. As shown in FIG. 6, the disk identification server 18 stores meta information, such as a title, a director, a cast, a production date or the like, in association with the disk identification information.

When the disk identification information is received from the image processing device 30, the disk identification server 18 storing such meta information transmits meta information associated with the received disk identification information to the image processing device 30. For example, when disk identification information "xxxxxx" is received, the disk identification server 18 transmits, to the image processing device 30, title "Spider-men 9," director "Sem Reimi," cast "Tobay Meguira" and the like.

Moreover, although an example has been described above where the image processing device 30 acquires the meta information of content from the disk identification server 18, the present embodiment is not limited to such an example. For example, the meta information of content may be stored in an optical disk, and the data reading section 320 may read the meta information from the optical disk.

Furthermore, when the meta information of content is received, the URL specifying section 336 specifies a URL of related information of the meta information. Specifically, a keyword search formula for searching for a Web page stored in the move information server 16 is set in advance, and the URL specifying section 336 specifies the URL of the related information by inserting the acquired meta information into the keyword search formula.

For example, a keyword search formula of the movie information server 16 with the keyword of "yyyy" is expressed as "http://www.movie_info.com/find?q=yyyy." Accordingly, when meta information "Sem Reimi" is acquired, the URL specifying section 336 specifies URL "http://www.movie_info.com/find?q=Sem Reimi."

The HTTP client 340 is a module for acquiring display information of a Web page expressed in HTML, XHTML or the like from the network 12. Particularly, in the present embodiment, the HTTP client 340 acquires display information of a Web page located at the URL specified by the URL specifying section 336. Furthermore, the HTTP client 340 can also acquire data expressed in XML from any service provider server having a web API.

The generation section 344 generates display information of a Web page to be displayed on the second display 20, based on the display information acquired by the HTTP client 340. A concrete example of a Web page generated by the generation section 344 and displayed on the display section 224 of the second display 20 is shown in FIG. 7.

Figure 7:
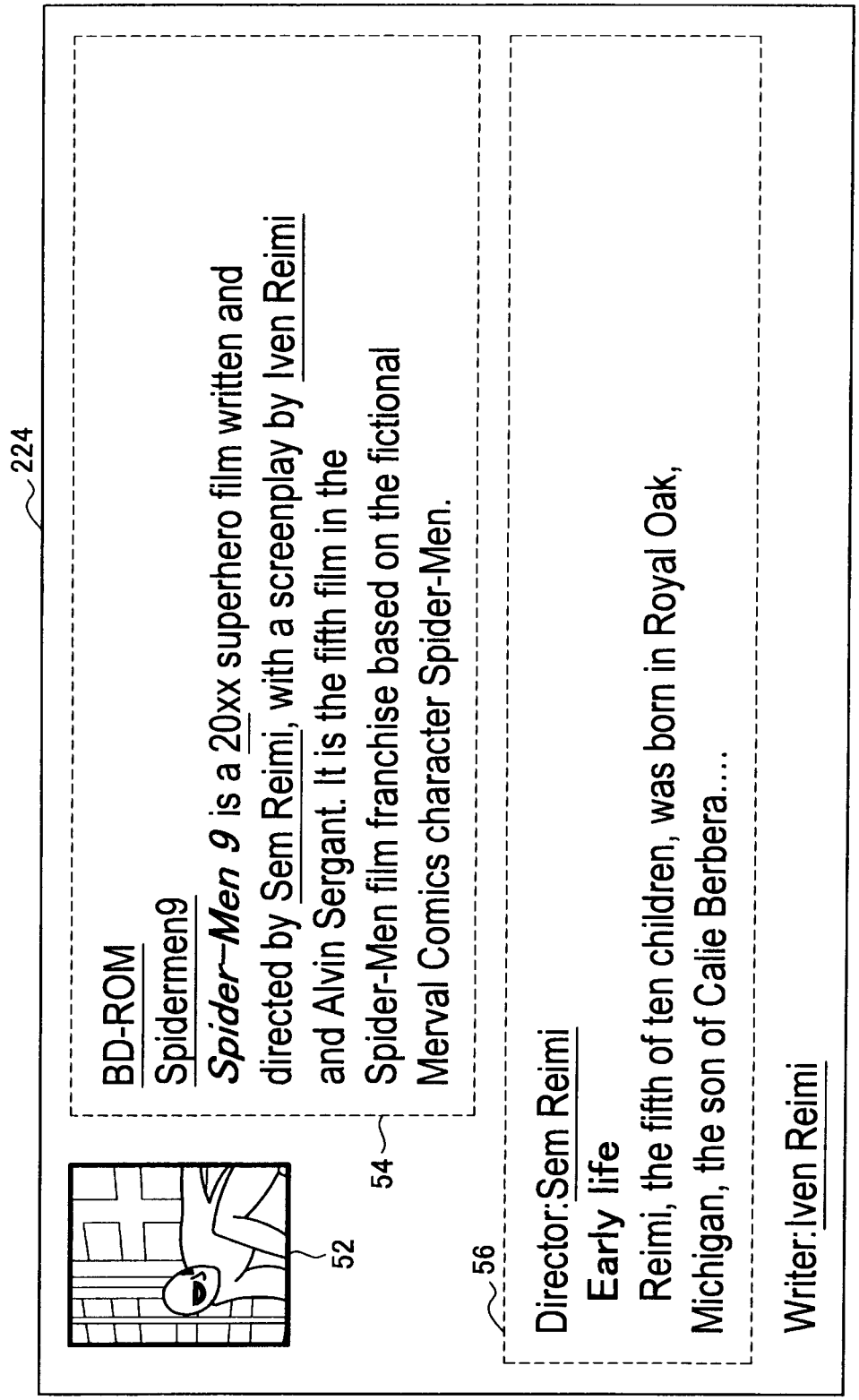
FIG. 7 is an explanatory diagram showing a first example of a Web page to be displayed on the second display.

FIG. 7 is an explanatory diagram showing a first example of a Web page to be displayed on the second display 20. As shown in FIG. 7, the Web page according to the first example includes a jacket photograph 52 of content, a content information window 54 in which summary of the content is described, a director information window 56 in which information of the director is described, and the like.

Display information of a Web page according to the first example is generated by the HTTP client 340 acquiring display information of a Web page relating to the title and the director of the content from the movie information server 16 and the generation section 344 combining these pieces of display information.

With this configuration, at the same time as playing back and displaying content on the main display 10, the second display 20 can be made to display related information of the content being played back. As a result, the user is enabled to view content on the main display 10, and at the same time, to easily perceive on the second display 20 nearer to the user than the main display 10 related information of the content being viewed.

Figure 8:
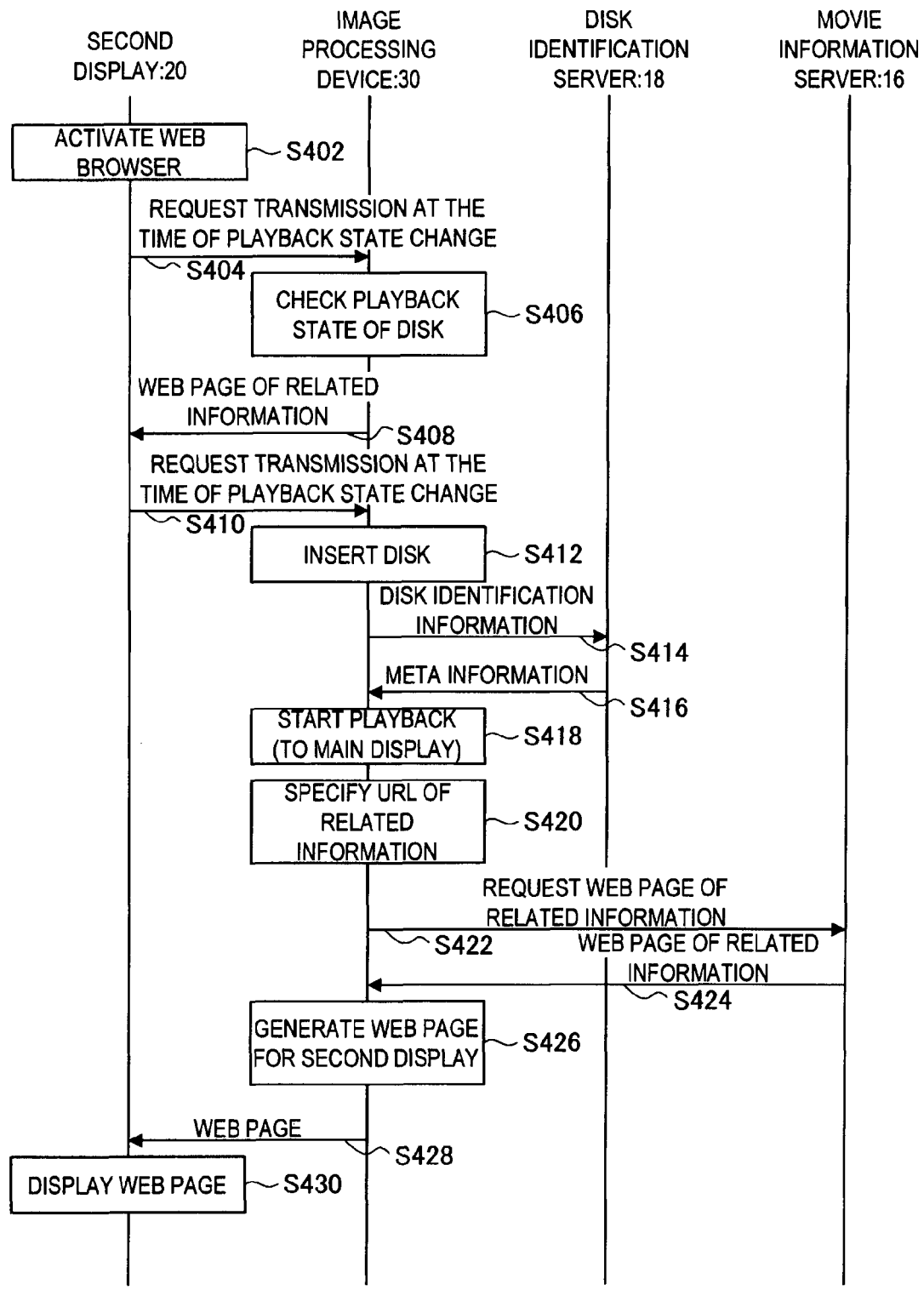
FIG. 8 is a sequence diagram showing a flow of the second display displaying the Web page according to the first example, in the image display system according to the first embodiment.

Next, with reference to FIG. 8, a flow of the second display 20 displaying the Web page according to the first example in the image display system 1 according to the first embodiment is described.

FIG. 8 is a sequence diagram showing the flow of the second display 20 displaying the Web page according to the first example, in the image display system 1 according to the first embodiment. As shown in FIG. 8, when the Web browser 220 is activated (S402), the second display 20 requests the image processing device 30 for a Web page of related information (S404).

The image processing device 30 checks playback state of an optical disk (S406), and if an optical disk is currently not inserted, transmits display information of a character string "No content is played," for example, to the second display 20 (S408). Then, the second display 20 requests the image processing device 30 to transmit, at the time the playback state changes, a Web page of related information (S410).

Then, when an optical disk is inserted into the image processing device 30 (S412), the communication section 316 transmits disk identification information of the optical disk to the disk identification server 18 based on a comet technology where a state change of the image processing device 30 serves as a trigger (S414). Then, the communication section 316 receives meta information from the disk identification server 18 (S416), and the playback control section 324 makes the playback section 328 start playback of content read from the optical disk by the data reading section 320 (S418). The content played back by the playback section 328 is outputted to the main display 10 and is displayed on the main display 10.

On the other hand, the URL specifying section 336 specifies, based on the meta information acquired from the disk identification server 18, a URL at which related information of the meta information is located (S420). An example where the URL specifying section 336 specified a URL on the movie information server 16 is shown in FIG. 8, and the HTTP client 340 requests display information of a Web page located at the specified URL on the movie information server 16 (S422). Then, the movie information server 16 transmits to the image processing device 30 the requested display information of a Web page (S424).

Subsequently, the generation section 344 of the image processing device 30 generates display information of a Web page for the second display 20 as shown in FIG. 7, for example, based on the display information of a Web page transmitted from the movie information server 16 (S426). Then, the communication section 316 transmits the display information of a Web page to the second display 20 (S428).

The Web browser 220 of the second display 20 generates a Web page by analyzing the display information transmitted from the image processing device 30, and makes the display section 224 display the Web page (S430). In this manner, according to the first example, related information of content being played back on the main display 10 can be displayed on the second display 20 without forcing the user to perform a particular operation on the second display 20.

Moreover, although, in the above, explanation has been made with a premise that playback target content is a movie, the playback target content is not limited to a movie. For example, in case the playback target content is a photograph with shooting location information (GPS data) added thereto, the URL specifying section 336 may specify a URL for searching for the location on a map based on the location information. As a result, at the same time as displaying the photograph on the main display 10, a map on which the shooting location of the photograph is marked can be displayed on the second display 20.

Furthermore, by applying the comet technology to the image processing device 30, a Web page to be displayed on the second display 20 can be switched with the reaching of the playback of content to a specific position, in addition to the playback start of content, as a trigger.

SECOND EXAMPLE

Subsequently, with reference to FIGS. 9 and 10, a configuration and operation for displaying a Web page according to a second example on the second display 20 will be described.

As with the first example, the URL specifying section 336 specifies a URL of related information of meta information. However, unlike the first example, the generation section 344 generates display information of a Web page for the second display 20 shown in FIG. 9, for example, without using display information of a Web page located at the specified URL.

Figure 9:
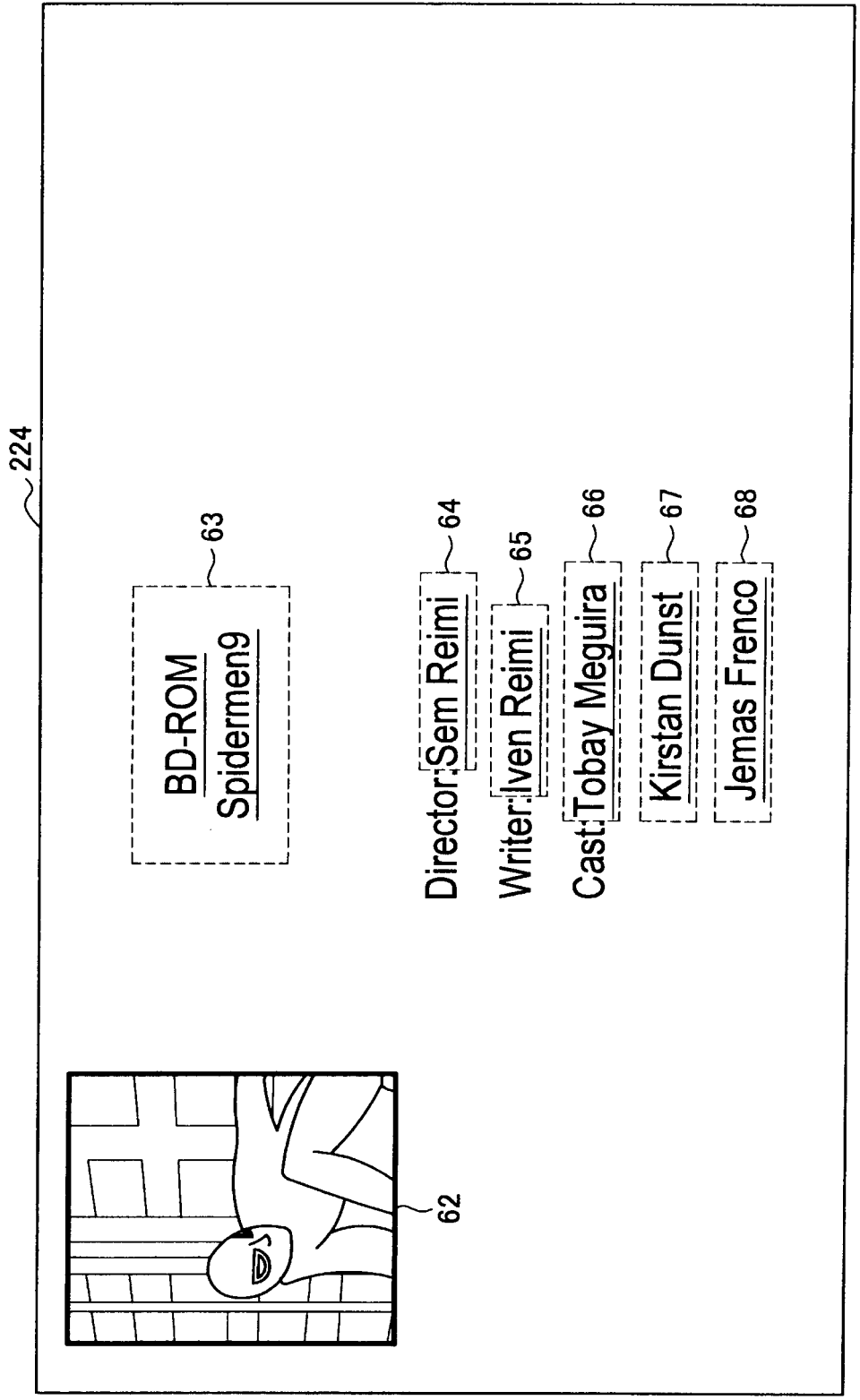
FIG. 9 is an explanatory diagram showing a second example of the Web page to be displayed on the second display.

FIG. 9 is an explanatory diagram showing the second example of the Web page displayed on the second display 20. As shown in FIG. 9, the Web page according to the second example includes a jacket photograph 62 of content, a content name 63, a director name 64, a writer name 65, cast names 66 to 68, and the like.

Here, URLs specified by the URL specifying section 336 are embedded in the content name 63, the director name 64, the writer 65, the cast names 66 to 68, and the like (first selection items). Accordingly, when the director name 64, for example, is selected by the user on the Web page according to the second example displayed on the second display 20, the Web browser 220 accesses the URL embedded in the director name 64. As a result, a Web page including related information of the director "Sem Reimi" is displayed on the display section 224 of the second display 20.

In this manner, the Web page according to the second example includes URL links of related information, and the second display 20 can acquire related information from the URL embedded in a selection item selected by the user and make the display section 224 display the related information. Moreover, a part of the display information of a Web page according to the second example generated by the generation section 344 is expressed as the following HTML source codes, for example.

Director:<a href=http://www.movie_info.com/find?q=Sem Reimi>Sem Reimi</a><br>
    Writer:<a href=http://www.movie_info.com/find?q=Iven Reimi>Iven Reimi</a><br>
    Cast:<a href=http://www.movie_info.com/find?q=Tobay Meguira>Tobay Meguira</a><br>
    <a href=http://www.movie_info.com/find?q=Kirstan Dunst>Kirstan Dunst</a>
    <a href=http://www.movie_info.com/find?q=Jemas Frenco>Jemas Frenco</a>

Subsequently, with reference to FIG. 10, a flow of the second display 20 displaying the Web page according to the second example in the image display system 1 according to the first embodiment is described.

Figure 10:
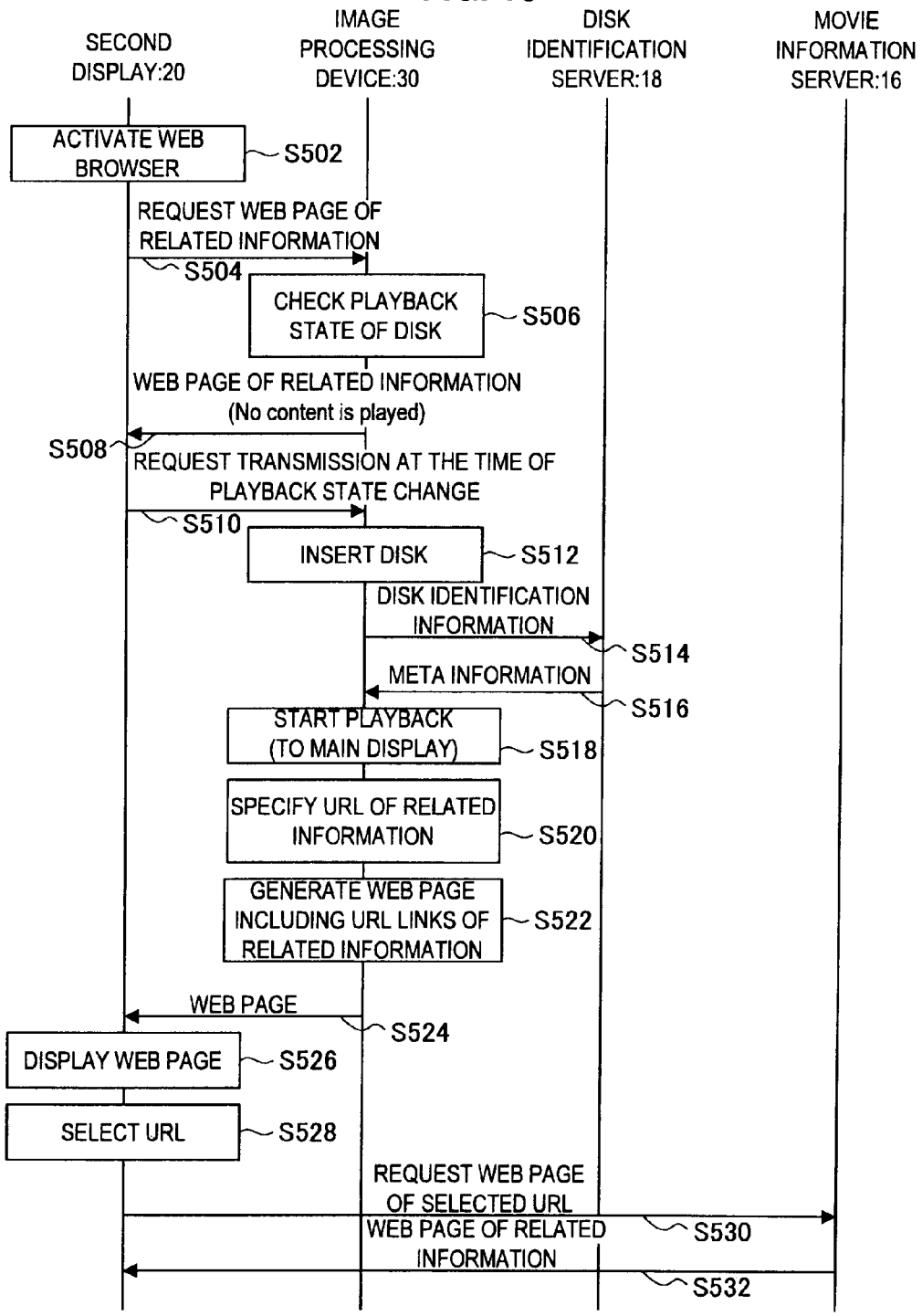
FIG. 10 is a sequence diagram showing a flow of the second display displaying the Web page according to the second example, in the image display system according to the first embodiment.

FIG. 10 is a sequence diagram showing the flow of the second display 20 displaying the Web page according to the second example, in the image display system 1 according to the first embodiment. As shown in FIG. 10, when the Web browser 220 is activated (S502), the second display 20 requests the image processing device 30 for a Web page of related information (S504).

The image processing device 30 checks playback state of an optical disk (S506), and if an optical disk is currently not inserted, transmits display information of a character string "No content is played," for example, to the second display 20 (S508). Then, the second display 20 requests the image processing device 30 to transmit, at the time the playback state changes, a Web page of related information (S510).

Then, when an optical disk is inserted into the image processing device 30 (S512), the communication section 316 transmits disk identification information of the optical disk to the disk identification server 18 based on a comet technology where a state change of the image processing device 30 serves as a trigger (S514). Then, the communication section 316 receives meta information from the disk identification server 18 (S516), and the playback control section 324 makes the playback section 328 start playback of content read from the optical disk by the data reading section 320 (S518). The content played back by the playback section 328 is outputted to the main display 10 and is displayed on the main display 10.

On the other hand, the URL specifying section 336 specifies, based on the meta information acquired from the disk identification server 18, a URL at which related information of the meta information is located (S520). Then, the generation section 344 generates display information of a Web page including links of the URLs specified by the URL specifying section 336 (S522), and the communication section 316 transmits the display information of a Web page to the second display 20 (S524).

The Web browser 220 of the second display 20 generates a Web page including the URL links by analyzing the display information transmitted from the image processing device 30, and makes the display section 224 display the Web page (S526). Then, when any of the selection items is selected on the Web page by the user (S528), the Web browser 220 requests display information of a Web page located at a URL embedded in the selection item (S530). Then, the movie information server 16 transmits to the second display 20 display information of a Web page of the requested related information (S532).

As a result, the Web browser 220 of the second display 20 can generate a Web page of the related information of the meta information of the content being played back on the main display 10, and make the display section 224 display the Web page. Moreover, the user can also browse another Web page from the Web page of the related information, or return to the URL links of the related information and browse a Web page of another related information.

THIRD EXAMPLE

Subsequently, with reference to FIG. 11, an operation for making the second display 20 display a Web page according to a third example will be described.

It is assumed that reviews of content are shared among a plurality of users by a social networking service (SNS), and that a time code (playback point of content) is added in a review regarding a specific scene. More particularly, the time code may be described at the beginning or the end of a review regarding a specific scene in a readable format such as <TimeCode=00:00:00>.

In this case, the URL specifying section 336 specifies a URL at which a review of playback target content is located, and the HTTP client 340 acquires the review of the playback target content from the URL. Then, the generation section 344 extracts the time code from the review acquired by the HTTP client 340, and generates a URL character string for time search for the playback point indicated by the time code. Then, as shown in FIG. 1, the generation section 344 generates display information of a Web page according to the third example in which the URL character string for time search is embedded.

Figure 11:
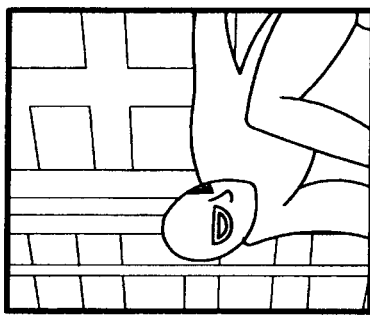
FIG. 11 is an explanatory diagram showing a third example of the Web page to be displayed on the second display.

FIG. 11 is an explanatory diagram showing the third example of the Web page displayed on the second display 20. As shown in FIG. 11, the Web page according to the third example includes a jacket photograph 72 of content, and scene selection items 74, 76 and 78 (third selection items). Furthermore, the following URL character string for time search is embedded in display information of the scene selection items 74, 76 and 78. Moreover, the generation section 344 replaces a time code included in a review with an <a> tag to generate the URL character string for time search.

<a href=http://<IP_address_of_image_processing_device_30>/video/time_search?time=00_05_32>Recommended_scene_A (00:05:32)</a>
    <a href=http://<IP_address_of_image_processing_device_30>/video/time_search?time=00_39_12>Recommended_scene_B (00:39:12)</a>
    <a href=http://<IP_address_of_image_processing_device_30>/video/time_search?time=01_10_53>Recommended_scene_C (01:10:53)</a>

When any of the scene selection items is selected by the user on the Web page according to the third example displayed on the second display 20, the request section 236 transmits to the image processing device 30 the URL character string for time search embedded in the scene selection item. Then, when the URL character string for time search is received by the Web server 348 of the image processing device 30, the playback control section 324 makes the playback section 328 playback content from the playback point indicated by the time code included in the URL character string for time search.

In this manner, the user can make the image processing device 30 start the playback from a specific scene in content and make the main display 10 display the same, by operating the second display 20 separate from the image processing device 30 and the main display 10. Moreover, the time code of a specific scene may be stored in an optical disk.

FOURTH EXAMPLE

Subsequently, with reference to FIG. 12, an operation for making the second display 20 display a Web page according to a fourth example will be described.

In the above, an example of making the second display 20 display a Web page of related information has been described. However, there may be a case where it is more desirable for the user to display the Web page of related information on the main display 10. For example, there may be a case where the user desires to have a Web page of related information expressed in a moving image format or a still image format displayed on the main display 10. Accordingly, as shown in FIG. 12, the generation section 344 may generate display information of a Web page including a button display for the user to select whether the Web page of related information is to be displayed on the second display 20 or on the main display 10.

Figure 12:
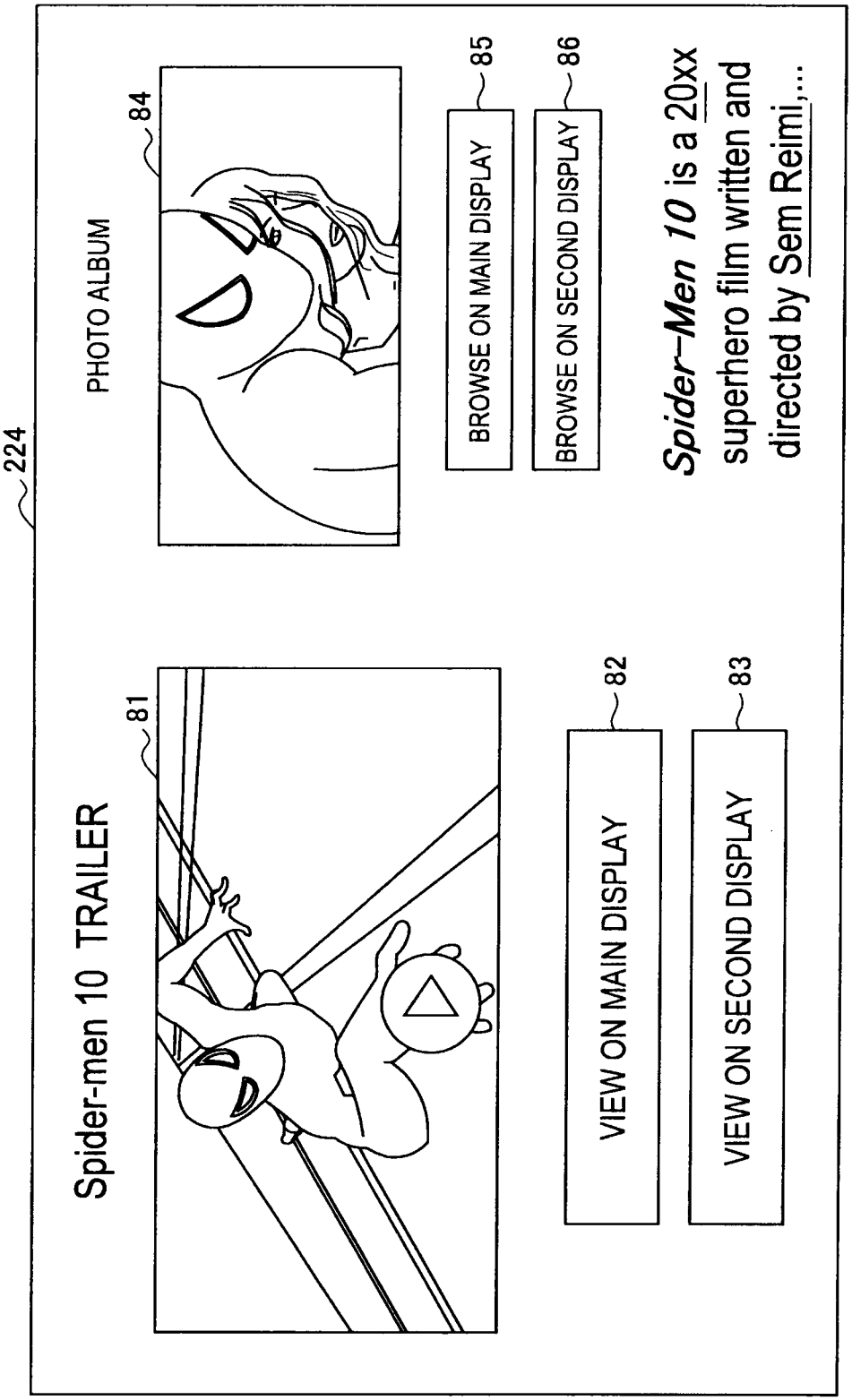
FIG. 12 is an explanatory diagram showing a fourth example of the Web page to be displayed on the second display.

FIG. 12 is an explanatory diagram showing a fourth example of the Web page to be displayed on the second display 20. As shown in FIG. 12, the Web page according to the fourth example includes a trailer display area 81, a photograph display area 84, button displays 82, 83, 85 and 86.

When the button display 83 (first selection item) is selected by the user on the Web page shown in FIG. 12, the Web browser 220 acquires display information of a Web page including a trailer video of "Spider-man 10," and displays the display information on the trailer display area 81. On the other hand, when the button display 82 (second selection item) is selected by the user, the request section 236 requests the image processing device 30 of the display of the trailer video of "Spider-men 10" on the main display 10.

Then, when the request from the second display 20 is received by the Web server 348 of the image processing device 30, the HTTP client 340 acquires the display information of a Web page including the trailer video of "Spider-men 10." Furthermore, the trailer video of "Spider-men 10" is outputted to the main display 10, and the main display 10 displays the trailer video of "Spider-men 10." Moreover, since other pieces of information are displayed on the second display 20, the main display 10 may display the trailer video using the entire screen. Furthermore, the button displays 82 and 83 are expressed as the following HTML source codes, for example.

<input type="button" name="b1" value="view on main display" onClick="play_on_md( )"/>
<input type="button" name="b2" value="view on second display" onClick="play_on_sd( )"/>

In a similar manner, when the button display 86 (first selection item) is selected by the user on the Web page shown in FIG. 12, the Web browser 220 acquires display information of a Web page including a photograph image of "Spider-men 10," and displays the display information in the photograph display area 81. On the other hand, when the button display 85 (second selection item) is selected by the user, the request section 236 requests the image processing device 30 of the display of the photograph image of "Spider-men 10" on the main display 10. In this manner, the user can select, according to the expression format, purpose or the like of related information, whether to display the related information on the second display 20 or on the main display 10.

<2. Second Embodiment>

The first embodiment described above has its premise that the second display 20 includes the Web browser 220. However, as is described in the following, an image display system 2 according to a second embodiment can be configured from a second display 20' not including a Web browser function.

Figure 13:
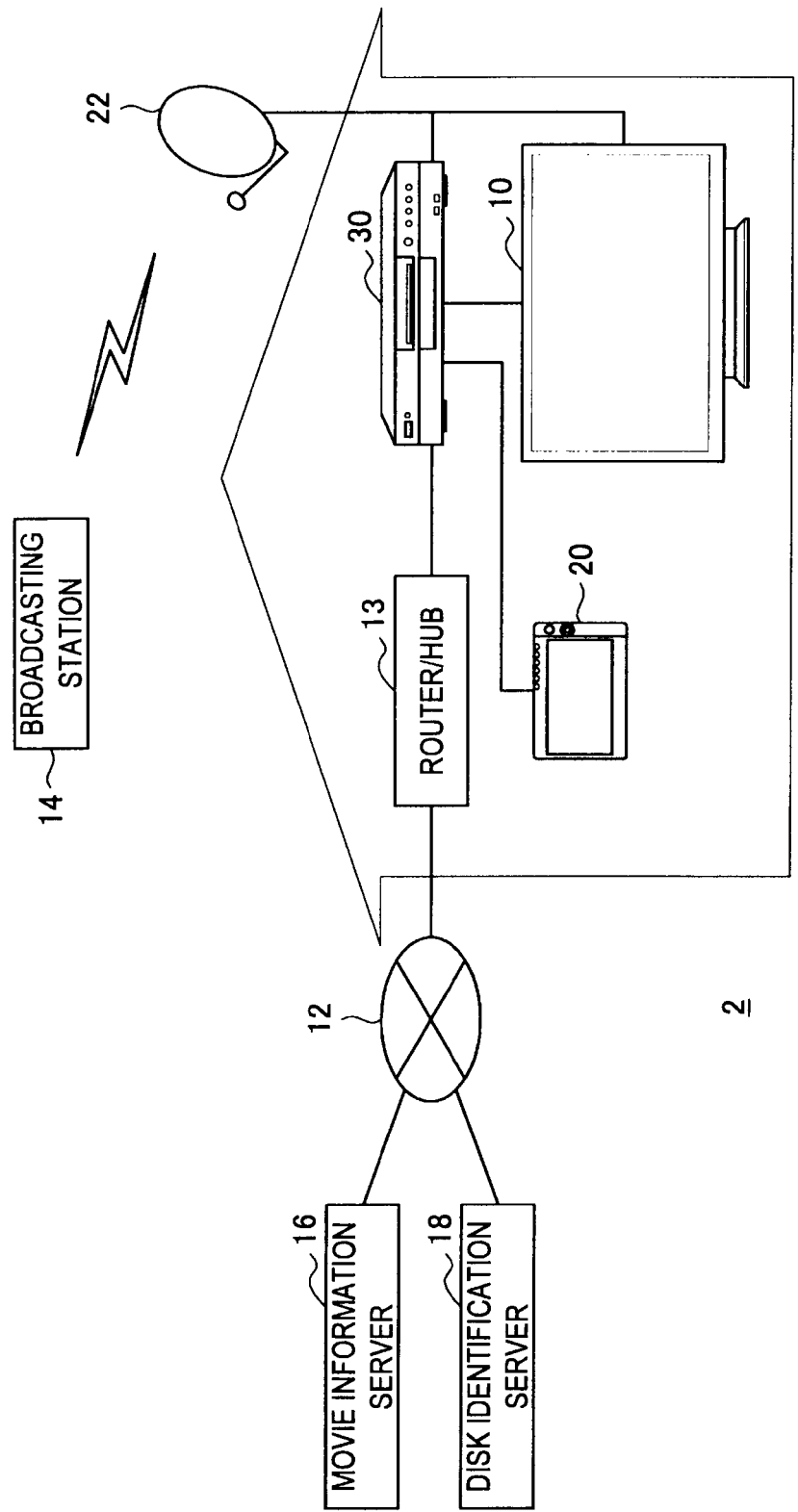
FIG. 13 is an explanatory diagram showing an overall configuration of an image display system according to a second embodiment of the present invention.

FIG. 13 is an explanatory diagram showing an overall configuration of the image display system 2 according to the second embodiment of the present invention. As shown in FIG. 13, the image display system 2 according to the second embodiment includes the main display 10, the router/hub 13, the second display 20', the antenna 22, and the image processing device 30. Furthermore, the image display system 2 includes the network 12, the broadcasting station 14, the movie information server 16, and the disk identification server 18. Moreover, since many of the configuration elements of the image display system 2 according to the second embodiment are the same as the configuration elements of the image display system 1 according to the first embodiment, an element different from that of the image display system 1 according to the first embodiment will be mainly described in the following.

The second display 20' according to the second embodiment differs from the second display 20 of the first embodiment in that, although the second display 20' is capable of communicating with the image processing device 30, it is not directly connect to the network 12. A configuration of the second display 20' according to the second embodiment will be described with reference to FIG. 14.

Figure 14:
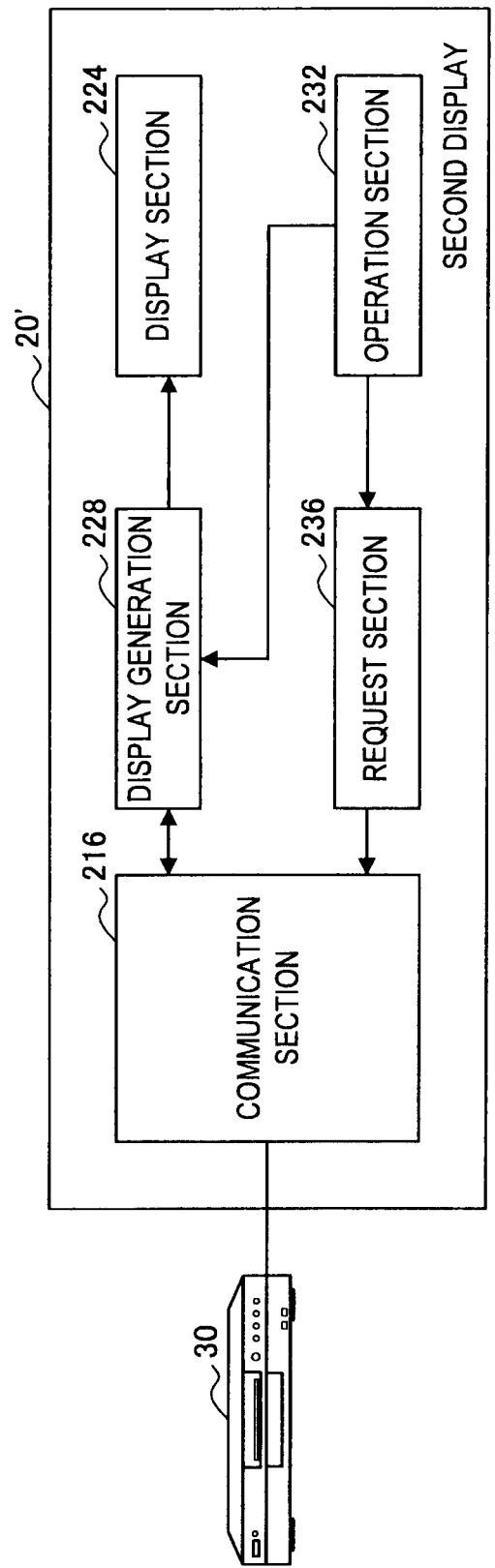
FIG. 14 is an explanatory diagram showing a configuration of the second display according to the second embodiment.

FIG. 14 is an explanatory diagram showing the configuration of the second display 20' according to the second embodiment. As shown in FIG. 14, the second display 20' includes the communication section 216, the display section 224, the display generation section 228, the operation section 232, and the request section 236, but does not include a Web browser. Thus, it is difficult for the second display 20' according to the second embodiment to interpret display information of a Web page, and even if the second display 20' acquires the display information of a Web page, displaying of the Web page is difficult.

Thus, in the present embodiment, the image processing device 30 serves as a proxy of the second display 20' to acquire display information of a Web page, converts the display information to a GUI with which the second display 20' is compatible, and supplies the GUI to the second display 20'. For example, the HTTP client 340 of the image processing device 30 acquires a Web page of related information of meta information of content being played back by the playback section 328, and the generation section 344 converts the Web page of the related information to a GUI with which the second display 20' is compatible.

More particularly, the generation section 344 performs conversion to a GUI in accordance to the resolution of the second display 20' or the specification of the operation section 232, and the GUI obtained by the conversion is supplied to the second display 20'.

With this configuration, the second display 20' according to the second embodiment can display a GUI which is equivalent to the Web page of related information described in the first embodiment, without including a Web browser function.

<3. Third Embodiment>

The first and second embodiments described above have their premise that the image processing device 30 plays back content. However, in a third embodiment described below, a device to play back content is not specifically limited.

Figure 15:
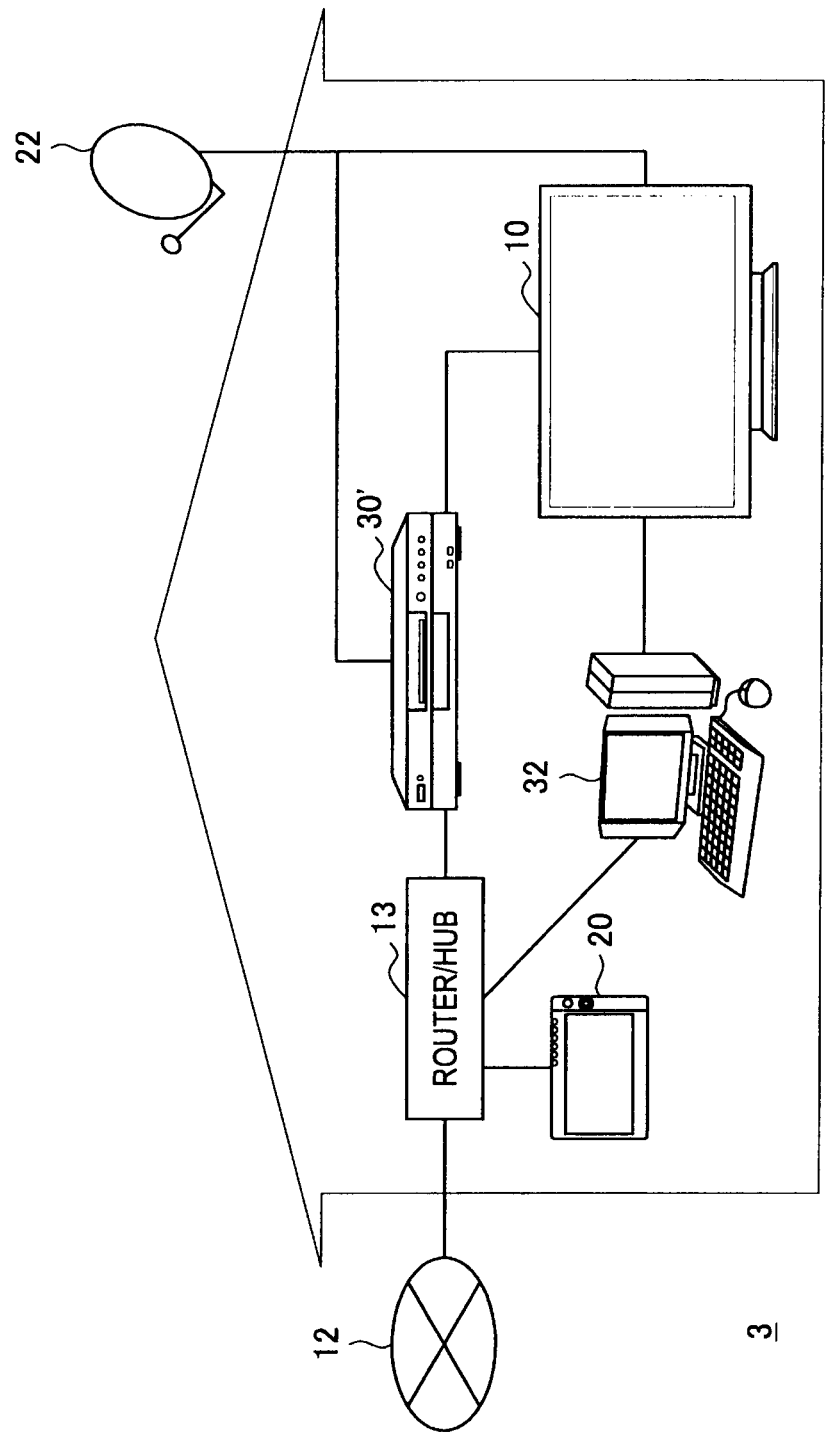
FIG. 15 is an explanatory diagram showing an overall configuration of an image display system according to a third embodiment of the present invention.

FIG. 15 is an explanatory diagram showing an overall configuration of an image display system 3 according to the third embodiment of the present invention. As shown in FIG. 15, the image display system 3 according to the third embodiment includes the main display 10, the router/hub 13, the second display 20, the antenna 22, an image processing device 30', and a PC 32. Furthermore, the image display system 3 includes the network 12, the broadcasting station 14, the movie information server 16, and the disk identification server 18. Moreover, since many of the configuration elements of the image display system 3 according to the third embodiment are the same as the configuration elements of the image display system 1 according to the first embodiment, elements different from those of the image display system 1 according to the first embodiment will be mainly described in the following.

The PC 32 plays back content, and outputs the played back content to the main display 10. Moreover, the PC 32 may playback content read from an optical disk, content read from a built-in HDD, or content acquired via the network 12.

Furthermore, the PC 32 transmits meta information of content being played back to the image processing device 30'. Moreover, the PC 32 may read the meta information from an optical disk, or may acquire the meta information from the disk identification server 18.

Like the first embodiment, the image processing device 30' is configured as the functional block diagram shown in FIG. 5. When meta information of content being played back by the PC 32 is received by the Web server 348 of the image processing device 30', the URL specifying section 336 specifies a URL of related information based on the meta information. Then, like the first embodiment, display of a Web page of the related information on the second display 20 is enabled by the image processing device 30' generating display information of a Web page of the related information and transmitting the same to the second display 20. Moreover, information for making access to the Web server 348 of the image processing device 30' may be set in the PC 32 in advance.

Next, with reference to FIG. 16, a flow of an image processing method to be executed by the image display system 3 according to the third embodiment will be described.

FIG. 16 is a sequence diagram showing a flow of an operation of the image display system 3 according to the third embodiment. As shown in FIG. 16, when the Web browser 220 is activated (S602), the second display 20 requests the image processing device 30' for a Web page of related information (S604).

The image processing device 30' checks playback state of content (S606), and since no playback of content is being performed by the image processing device 30' or the PC 32, transmits display information of a character string "No content is played," for example, to the second display 20 (S608). Then, when the second display 20 requests the image processing device 30' to transmit, at the time the playback state changes, a Web page of related information (S610), the image processing device 30' makes the same request to the PC 32 included in the image display system 3 (S612).

Then, when the PC 32 starts playback of content (S614), the played back content is outputted to the main display 10 and is displayed on the main display 10. Furthermore, the PC 32 transmits meta information of the content to the image processing device 30' (S616).

When the meta information of the content being played back by the PC 32 is received by the Web server 348 of the image processing device 30', the URL specifying section 336 specifies a URL of related information based on the meta information (S618). Then, the generation section 344 generates display information of a Web page including links of the URLs specified by the URL specifying section 336 (S620), and the communication section 316 transmits the display information of a Web page to the second display 20 (S622).

The Web browser 220 of the second display 20 generates a Web page including the URL links by analyzing the display information transmitted from the image processing device 30', and makes the display section 224 display the Web page (S624). Then, when any of selection items is selected on the Web page by the user (S626), the Web browser 220 requests display information of a Web page located at the URL embedded in the selection item (S628). Then, the movie information server 16 transmits to the second display 20 display information of a Web page of the requested related information (S630).

As a result, the Web browser 220 of the second display 20 can generate a Web page of the related information of the meta information of the content being played back by the PC 32, and make the display section 224 display the Web page.

<4. Supplementary>

It should be understood by those skilled in the art that various modifications, combinations, sub-combinations and alterations may occur depending on design requirements and other factors insofar as they are within the scope of the appended claims or the equivalents thereof.

For example, each of the steps performed by the image display system 1 in this specification does not necessarily have to be performed chronologically in the order shown in the sequence diagrams. For example, each of the steps of the processing by the image display system 1 may include processing that is performed in parallel or individually (for example, parallel processing or object processing).

Furthermore, although an example of making the second display 20 display a Web page of related information of content currently being played back has been described above, the present invention is not limited to such an example. For example, the second display 20 may be made to display a Web page of related information of content before playback or after playback.

A computer program may also be provided that directs hardware such as the CPU 201, the ROM 202, the RAM 203 and the like built in the image processing device 30 and the second display 20 to fulfill functions corresponding to each of the configuration elements of the image processing device 30 and the second display 20 described above. A storage medium storing the computer program is also provided. Each of the function blocks shown in the functional block diagrams of FIGS. 4 and 5 can also be configured using hardware so as to perform the series of processes by the hardware.

The present application contains subject matter related to that disclosed in Japanese Priority Patent Application JP 2008-246791 filed in the Japan Patent Office on Sep. 25, 2008, the entire content of which is hereby incorporated by reference.

What is clamed is:

1. An information processing apparatus comprising:
   at least one processor;
   a meta information identification section for identifying meta information of content displayed on a first display device;
   a specifying section for specifying network location information of information relating to the meta information;
   a generation section, executing on the at least one processor, for generating display information simultaneously displayed on the first display device and a second display device, based on the network location information, wherein the content simultaneously displayed on the first display device and displayed on the second display device are different, the generation section generates a display area on a screen of the second display device including a first selection item associated with the content displayed on the first display device, and when the first selection item is selected on the second display device, the display area of the second display device displays a portion of the content displayed on the first display device;

a communication section for transmitting the display information to the second display device and for transmitting the display information to the first display device;

a playback control section for controlling playback of the content displayed on the first display device; and a related information identification section configured to identify supplemental content information from a location indicated by the network location information, wherein the supplemental content information comprises information indicating a playback point in the content displayed on the first display device associated with the identified supplemental content information.

2. The information processing apparatus according to claim 1, wherein the generation section generates the display information of a screen including a second selection item associated with the network location information, and when the second selection item is selected on the second display device, the information relating to the meta information is identified by the second display device from a location indicated by the network location information.

3. The information processing apparatus according to claim 2, wherein the generation section further generates the display information of a screen including a third selection item associated with the network location information; and the information processing apparatus includes a related information identification section for identifying information relating to the meta information from a location indicated by the network location information, when the third selection item is selected on the second display device, and a display control section for making the first display device display the information relating to the meta information.

4. The information processing apparatus according to claim 1, wherein the generation section generates the display information of a screen including a fourth selection item associated with the playback point, and the playback control section performs control so that, when the fourth selection item is selected on the second display device, the content is played back from the playback point on the first display device.

5. The information processing apparatus according to claim 1, wherein the generation section generates the display information of a screen indicating the information relating to the meta information.

6. The information processing apparatus according to claim 1, wherein the identification section identifies, from a playback device playing back content displayed on the first display device, the meta information of the content.

7. An information processing method, comprising the steps of:

identifying meta information of content displayed on a first display device;

specifying network location information of information relating to the meta information;

generating display information simultaneously displayed on the first display device and a second display device, based on the network location information, wherein the content simultaneously displayed on the first display device and displayed on the second display device are different;

generating a display area on a screen of the second display device including a first selection item associated with the content displayed on the first display device, and when the first selection item is selected on the second display device, the display area of the second display device displays a portion of the content displayed on the first display device; and transmitting the display information to the first display device and second display device;

controlling playback of the content displayed on the first display device; and identifying supplemental content information from a location indicated by the network location information, wherein the supplemental content information comprises information indicating a playback point in the content displayed on the first display device that is associated with the identified supplemental content information.

8. The information processing method according to claim 7, wherein the display information of a screen including a second selection item associated with the network location information is generated in the step of generating, and when the second selection item is selected on the second display device, information relating to the meta information is identified by the second display device from a location indicated by the network location information.

9. The information processing method according to claim 8, wherein the display information of a screen including a third selection item associated with the network location information is further generated in the step of generating; and the information processing method further includes the steps of identifying information relating to the meta information from a location indicated by the network location information, when the third selection item is selected on the second display device, and making the first display device display the information relating to the meta information.

10. An information processing system comprising:

a first display device for displaying content;

a second display device, wherein different content is simultaneously displayed on the first display device and the second display device;

an information processing apparatus including a meta information identification section for identifying meta information of the content displayed on the first display device, a specifying section for specifying network location information of information relating to the meta information, a generation section for generating display information of a screen based on the network location information, wherein the generation section generates a display area on a screen of a second display device including a first selection item associated with the content displayed on the first display device, and when the first selection item is selected on the second display device, the display area of the second display device displays a portion of the content displayed on the first display device, a communication section for transmitting the display information to the first display device, wherein the second display device is configured to display a screen based on the display information, a playback control section for controlling playback of the content displayed on the first display device; and a related information identification section configured to identify supplemental content information from a location indicated by the network location information, wherein the supplemental content information comprises information indicating a playback point in the content displayed on the first display device associated with the identified supplemental content information.

* * * * *